US009225795B2

(12) United States Patent
Mostafa et al.

(10) Patent No.: US 9,225,795 B2
(45) Date of Patent: Dec. 29, 2015

(54) METHOD AND APPARATUS FOR ENABLING RECIPIENT INTERACTION WITH A CONTENT STREAM

(71) Applicant: Rubriq Corporation, McLean, VA (US)

(72) Inventors: Asghar D. Mostafa, McLean, VA (US); Thomas J. Brown, West McLean, VA (US); Dyanna T. Gerber, Falls Church, VA (US)

(73) Assignee: Rubriq Corporation, McLean, VA (US)

( * ) Notice: Subject to any disclaimer, the term of this patent is extended or adjusted under 35 U.S.C. 154(b) by 373 days.

(21) Appl. No.: 13/679,825

(22) Filed: Nov. 16, 2012

(65) Prior Publication Data

US 2013/0132515 A1 May 23, 2013

Related U.S. Application Data

(60) Provisional application No. 61/561,786, filed on Nov. 18, 2011.

(51) Int. Cl.
*H04L 29/08* (2006.01)
*H04N 21/472* (2011.01)
(Continued)

(52) U.S. Cl.
CPC ............ *H04L 67/32* (2013.01); *H04N 21/4725* (2013.01); *H04N 21/4755* (2013.01); *H04N 21/47205* (2013.01); *H04N 21/8583* (2013.01)

(58) Field of Classification Search
CPC ............ H04L 67/32; H04N 21/47205; H04N 21/8583; H04N 21/4755; H04N 21/4725; H04N 21/47; H04N 21/47815; H04N 21/812; G06Q 30/06; G06Q 30/061; G06Q 30/0641
USPC .......... 709/217; 705/27.1, 26.1, 27.2; 725/32, 725/37, 40, 42, 60, 4, 34–36
See application file for complete search history.

(56) References Cited

U.S. PATENT DOCUMENTS 6,006,265 A   12/1999 Rangan et al.
6,282,713 B1 * 8/2001 Kitsukawa ............. G06Q 30/02
                                                      348/E5.105
(Continued)

FOREIGN PATENT DOCUMENTS

EP      1 443 768 A1    8/2004
WO   WO 2009/129345 A1  10/2009
(Continued)

OTHER PUBLICATIONS

Notification Concerning Transmittal of International Preliminary Report on Patentability for PCT/US2012/065554, "Method and Apparatus for Enabling Recipient Interaction With a Content Stream," date of mailing, May 30, 2014.

(Continued)

*Primary Examiner* — Mark Rinehart
*Assistant Examiner* — Kenneth P Hunt
(74) *Attorney, Agent, or Firm* — Hamilton, Brook, Smith & Reynolds, P.C.

(57) ABSTRACT

Passive advertising via a video display unit or radio passive advertising is performed through the insertion of commercials at specific time locations based on signaling provided in a video or audio broadcast stream. However, such advertising systems do not take advantage of a recipient's first impulse to react to the advertisement, thereby losing a potential sale. Embodiments disclosed herein provide a recipient of a video display or radio broadcasts with real-time information on products (e.g., goods or services) placed in the video display or radio broadcasts. In addition, embodiments provide the recipient with a real-time opportunity to gather information or to respond to requests (e.g., marketing requests) at the time associated with the recipient's initial impulse to act in response to receiving the video display or radio broadcast.

41 Claims, 13 Drawing Sheets

(51) Int. Cl.
*H04N 21/4725* (2011.01)
*H04N 21/475* (2011.01)
*H04N 21/858* (2011.01)

(56) References Cited

U.S. PATENT DOCUMENTS

| | | | |
|---|---|---|---|
| 7,711,609 B1 * | 5/2010 | Rolf | G06Q 30/02 |
| | | | 705/26.5 |
| 7,937,458 B2 * | 5/2011 | Nanamura | G06F 9/46 |
| | | | 700/94 |
| 8,165,927 B2 * | 4/2012 | Abrams | G06Q 30/06 |
| | | | 705/27.1 |
| 2002/0120935 A1 | 8/2002 | Huber et al. | |
| 2004/0122746 A1 * | 6/2004 | Charlier | G06Q 30/0641 |
| | | | 705/27.1 |
| 2008/0089551 A1 | 4/2008 | Heather et al. | |
| 2008/0285940 A1 | 11/2008 | Kulas | |
| 2009/0175594 A1 | 7/2009 | Ann et al. | |
| 2009/0276805 A1 * | 11/2009 | Andrews II | G06Q 30/02 |
| | | | 725/35 |
| 2010/0251281 A1 | 9/2010 | Craner | |
| 2011/0137753 A1 * | 6/2011 | Moehrle | G06Q 30/02 |
| | | | 705/27.1 |

FOREIGN PATENT DOCUMENTS

| | | |
|---|---|---|
| WO | WO 2010/036375 A1 | 4/2010 |
| WO | WO 2010/118511 A1 | 10/2010 |
| WO | WO 2013/074947 | 5/2013 |

OTHER PUBLICATIONS

Notification of Transmittal of International Search Report and Written Opinion of the International Searching Authority, or the Declaration for International Application No. PCT/US2012/065554 "Method and Apparatus for Enabling Recipient Interaction With a Content Stream", date of mailing May 15, 2013.

* cited by examiner

METHOD AND APPARATUS FOR ENABLING RECIPIENT INTERACTION WITH A CONTENT STREAM

RELATED APPLICATION

This application claims the benefit of U.S. Provisional Application No. 61/561,786, filed on Nov. 18, 2011, the entire teachings of which are incorporated herein by reference.

BACKGROUND OF THE INVENTION

Passive advertising via a video display unit (e.g., a television, smart phone, tablet, personal computer) or radio passive advertising is performed through the insertion of commercials at specific time locations based on signaling provided in a video or audio broadcast stream. The signaling alerts an advertising server to transmit a video stream that is then inserted in the broadcast stream for viewing by those watching the television show or listening to the radio broadcast. In addition to passive advertising, there is a background form of advertising called "product placement." Product placement is a form of advertisement in which branded goods or services are placed in a context, usually devoid of advertisements, such as movies, music videos, the story line of television shows, or news programs. When a viewer sees, for example, in a show, a branded good (also referred to herein as an object) or a logo associated with a service that identifies of a source (e.g., manufacturer of the good or service), inclusion of the branded object (e.g., car, device, clothing, etc.) or logo in the show is considered to be 'product placement' and the manufacturer of the show is typically required to pay a fee to the manufacturer for placement of the branded object or logo in a video scene of the show.

SUMMARY OF THE INVENTION

An embodiment of the present invention is a method, apparatus, system, or computer readable medium, with program codes embodied thereon, for enabling recipient interaction with a content stream. The embodiment identifies representations, of real-world objects or services in content, to be sent to a recipient via the content stream and associates identifiers with at least a subset of the representations. In addition, the embodiment sends the content with the identifiers to the recipient in a manner enabling the recipient to interact with the subset of the representation via the identifiers. Further, the embodiment enables interactions by the recipient to cause information, selected based on the identifiers, to be provided to the recipient or a third-party recipient. Interaction with the identifiers changes, in effect, the state of a corresponding representation of the real-world objects or services.

In addition, the content stream may be an audio data stream or a visual data stream. Further, the information may be provided contemporaneously or at a subsequent time relative to the recipient interaction with the subset of the representations. In addition, the embodiment may provide the information selectively based on at least one of the following: a type of the information, subscription status of the client associated with the information, and profile of the recipient.

Further, the embodiment may activate or deactivate the presentation of the content in a manner enabling a recipient of the content to interact with the subset of the representations via the identifiers based on a preference of the recipient, control by a provider of the content, or optional selection by an entity associated with a corresponding subset of the objects. The embodiment may also overlay the identifiers over the content or overlay an indicator of identifiers over the content, wherein the indicator may optionally be invisible. Alternatively, an image of the representation of the real-world object or service may serve as both the representation and the identifier.

The embodiment may also present the information via a device separate from a device used to present the content to the recipient. Further, the information presented to the user may be at least one of the following: an advertisement, voting tool, polling information, or auction information.

Another embodiment of the present invention includes identifying representations, of real-world objects or services in content, to be sent to a recipient via a content stream and associating identifiers with at least a subset of the representations. Further, the embodiment may send the content with the identifiers to the recipient in a manner enabling the recipient, receiving the content and identifiers on the device, to interact with the representations via the identifiers through use of a recipient-to-device interface.

Another embodiment presents content to recipient in a manner enabling the recipient of the content to interact with a representation of an object in a content stream via identifiers, where interactions by the recipient cause information, selected based on the identifiers, to be provided to the recipient of the content or a third-party recipient.

Further an alternative embodiment provides information targeted to a specific recipient. The embodiment observes identifiers associated with representations, of real-world objects or services in content, in a content stream and determines metrics associated with the identifiers.

The embodiment may determine metrics associated with identifiers corresponding to the representations, of the real-world objects or services in content, by a recipient of the content stream. In addition the embodiment may determine metrics associated with interactions with interactive identifiers corresponding to the representations, of the real-world objects or services in content, by the recipient of the content stream. In addition, the embodiment may determine metrics associated with attempts at interactions with disabled interactive identifiers corresponding to the representations, of the real-world objects or services in content, by the recipient of the content stream. Further the embodiment may offer to enable interaction with the representations, of the real-world objects or services in content, to entities involved with commercial use of objects (e.g., goods) or services by demonstrating value based on the metrics.

In addition, determining the metrics may include collecting the metrics on at least a content server, intermediate network node, source notes, or destination node of the content stream. Further, the metrics may be at least one of the following: an overall count of the representations of the real-world objects or services in content, count of incidences of viewing, or interactions with attempted interactions with the identifiers. In addition, the identifiers may provide indications of the presence of the representations, of the real-world objects or services in content, within the content stream.

Further an embodiment of an apparatus for enabling recipient interaction with a content stream may comprise an identifier module configured to identify representations, of real-world objects or services in content, to be sent to a recipient via the content stream, an associating module configured to associate identifiers with at least a subset of the representations, and a transmitting module configured to send the content with the identifiers to the recipient in a manner enabling the recipient to interact with the subset of the representations via the identifiers, interactions by the recipient causing information, selected based on the identifiers, to be provided to the recipient or a third party recipient. The apparatus may be a computer server including a processor and the identifier, associating, and transmitter modules may include non-transitory computer readable medium containing instructions that may be loaded and executed by the processor.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Background advertising (e.g., product placement) requires the viewer to recognize the logo or source of goods (referred to interchangeably herein as an "object") or service. Background advertising provides no mechanism for viewers to find other details about the object. If the viewer fails to recognize or associate with the background item placement, the viewer then has no ability to identify the object at all. Therefore, the most frequent use of product placement may be beneficial only for more established brands.

Embodiments of the present invention provide a recipient of a video display unit or radio broadcasts with real-time information on about goods or services placed in the video display unit (e.g., television) or radio broadcasts. In addition, embodiments disclosed herein provide the recipient with a real-time opportunity to gather information or to respond to requests (e.g., marketing requests) at the time associated with the recipient's initial impulse to act in response to receiving the television or radio broadcasts.

Current overlay advertising systems may deal with the viewer operating on a single screen, such as in a case in which content is streamed via the Internet. However, this method only works for a single viewer watching a single show on a single digital device. In situations where a viewer is watching a television broadcast in a room with other viewers, the viewer cannot interrupt the display to see the overlay advertisement without disturbing the other viewers. Embodiments disclosed herein utilize a shared display (e.g., television, movie theater screen) and a personal display (e.g., smart phone, tablet, remote, laptop, biometric feedback device, etc.) to provide associated advertising to the individual viewer without affecting other viewers. Thus, advantages of embodiments disclosed herein enable targeted advertisements for individual or multiple viewers sharing a common display used to display a video broadcast. In addition, advantages of embodiments disclosed herein enable targeted advertisements for individual or multiple listeners sharing a common radio output device of a radio broadcast. Further, embodiments of the present invention may be applied to a single display, such as a television using only a remote control.

Figure 1A:
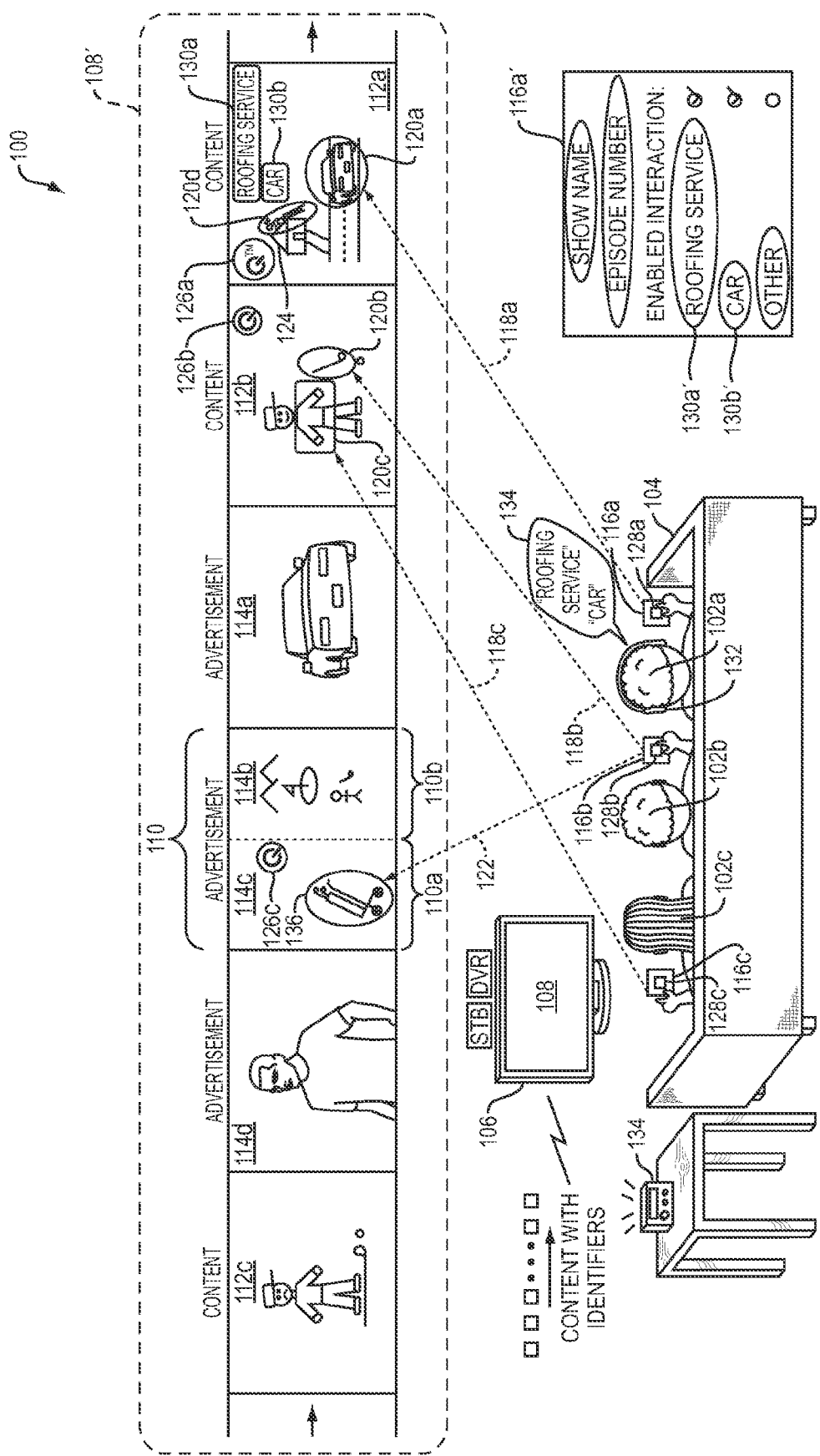
FIG. 1A shows an example of an environment in which recipient interaction with a content stream is enabled according to embodiments disclosed herein.

FIG. 1A shows an example of an environment 100 in which recipient interaction with a content stream is enabled according to embodiments disclosed herein. A recipient may also be referred to as a viewer, user, reader, listener, observer, subscriber, or person herein. The environment 100 includes recipients, such as a set of viewers 102a-c, sitting on a couch 104 watching a shared television display 106. Each viewer may have a unique profile (not shown) stored on a database or other data source accessible by a device used to implement an embodiment of the present invention.

The shared television display 106 of FIG. 1A is showing a television broadcast 108 being aired and sent via a content stream 108'. The television broadcast 108 includes video scenes of content 112a-c from a television show that is interleaved with video scenes of advertisement 114a-d (e.g., commercials) as shown by the content stream 108'. The content stream may be a visual data stream or an audio data stream. For example, the recipients, such as viewers 102a-c, may alternatively be listeners of a radio broadcast 134. The recipients can be wearing a headset 132 or other suitable wired or wireless audio receiving device or simply listening to the broadcast from a speaker.

The television show may include a scene of content 112a that shows a person leaving home and heading in a car 120a for a round of golf. In the hypothetical show, he person may have decided to leave for the round of golf because the person was unable to do any work around the house due to noise caused by hammering of a roofing service 120d repairing shingles on the roof of the house. In subsequent scenes of content 112b, the person may be trying to swing a golf club 120b, and the person may be wearing a golf shirt 120c. In the show, the person may be trying golf for the first time and be very happy about trying this new sport. However, after multiple attempts to hit the golf ball, the person in the show may become frustrated and be shown in yet a further subsequent scene of content 112c as being unhappy and stomping on the golf club. As the viewers 102a-c are watching the show, the viewers 102a-c see representations of real-world objects or services, such as the car 120a, golf club 102b, golf shirt 102c, or roofing service 120d that pique interests.

For example, a first viewer 102a may be interested in information about the car 120a or roofing service 120d, a second viewer 102b may be interested in information about a golf club 120b, and a third viewer 102c may interested in information about a golf shirt 120c. Embodiments disclosed herein may enable recipient interaction with the content stream. A person who is viewing, reading, or listening to content (e.g., TV, online, tablet, phone, radio, or other) may be presented with cue(s), optionally indicated by a symbol on the object or elsewhere within a frame of the content, that notify the person that there is an opportunity to interact with the content.

The interaction may be based on the representations, of real-world objects or services, in the content. Embodiments disclosed herein may enable the person to interact in a variety of ways. The person may purchase goods or services represented within the content, request information regarding the goods or services, rate the content, provide opinions or feedback regarding the information in the content, or interact in any other manner enabled. Interactions by the recipient to cause information, selected based on the identifiers, to be provided to the recipient or a third-party recipient can be delivered in a variety of ways and via a variety of electronic devices or paper formats.

As the viewers 102a-c are watching the content stream 108' progress, an indicator or "cue," such as the indicator icons 126a-c, may be visible if interactions with the content are enabled. The cue may be an indicator icon or any other suitable indicator that may alert a viewer that a potentially interesting item can be viewed and acted on by the viewer. A viewer may be given an option to interact based on whether or not an advertiser of the product or service has paid to have interaction enabled.

The cue may be an interactive element that appears in a predetermined location of the viewable area or highlighted in any manner known in the art. The predetermined location may be configured by the content provider (not shown) and may be based on the particular scene or background. The predetermined location may be configured to enable the most effective placement for the particular scene or background.

The viewers 102a-c in the environment 100 may have a personal display 116a-c. The associated personal display may provide information, such as associated advertising to the individual viewers 102a-c, without affecting the other viewers' from sharing the common display used to display the video broadcast.

If a viewer has an interest in any of the representations of real-world objects or services shown, and a cue indicates to the viewer that interaction is enabled, the viewer may push a button on a personal display, such as the button 128a-c. According to one embodiment, the button may be tailored to look the same as the cue. The viewer may interact with the content at the time that the content is shown without affecting viewers watching the same content.

For example, the viewer 102a may have an interest in the car 120a shown in the content 112a. The viewer 102a may see that interaction is enabled based on seeing the cue 126a shown along with the content 112a. The viewer 102a may press the key 128a during the time that the content 112a and the cue 126a are shown. By pushing a button 128a or enabling an application ("app") during the time that the content 112a and the cue 126a are shown, the viewer 112a may be enabled to interact with the content in a variety of ways. The interaction with the identifiers changes, in effect, the state of a corresponding representation of the real-world objects or services, as the recipient may be enabled to view or receive more detailed information regarding the real-world objects or services than could be gleaned from the product placement. For example, the viewer may be enabled to interact in any suitable manner such as by pressing a key, clicking a remote, launching an "app" on a smart phone or other personal device, or clicking a mouse, etc. The viewer may receive a confirmation message that information corresponding to the representation has been sent to the recipient. The confirmation message may be shown as an overlay on the display screen that is showing the scene or on any other device that may be configured by the viewer. Alternatively the confirmation message may be sent to the recipient in any suitable manner such as by an email, posting on a website, etc.

For example, the product website or social media site may be brought up on the person's personal display. The viewer 102a may shop immediately on the product website on the personal display 116a without interrupting viewing of others, such as 102b and 102c viewing the common content 108'. The viewer 102a, through use of the interaction, does not need to perform a search of the product web-site, as the product web-site may be brought up automatically on the viewer's 102a personal display 116a. The viewer 102a may also "like" the product on the social media website. The viewer may also be enabled to shop immediately while pausing the show in the background.

The viewers 102a-c may be presented with a choice of products or services for interaction. Multiple advertisers of the representation of the real-world objects or services in content may have paid to have interaction enabled, or a single advertiser of multiple real-world objects or services in content may have paid to have interaction enabled. Cues, such as cues 130a and 130b, may be shown as a list of choices of products or services for interaction.

For example, the content 112a may show an overlay with text indicating that the car and roofing service shown are available for interaction. The viewer 102a may press the cue key 128a during a time that the interactive content is displayed, and the viewer 102a may be presented on the personal display 116a with a listing of all products or services enabled for interaction in the content 112a, and the viewer 102a may select one or more of the products or services causing information, selected based on identifiers associated with at least a subset of the representations, or real-world products or services, to be provided to the viewer 112a.

For example, the screen 116a' including the listing 130a' and 130b' may be presented to the first viewer 102a after the first viewer 102a triggers the interaction by pushing a button 128a. A button may be a physical button, such as a key on a keyboard, an area of a screen display that is activated based on touch, or any other suitable mechanism for triggering the interaction, such as voice triggered interaction 134 (e.g., the user speaks a word or phrase corresponding to the interactive content). The interaction may be triggered by one or more buttons, keys, voice utterance, or any sequence, combination, or sequence thereof. For example, the recipient may use a wired or wireless microphone to provide voice utterances.

If a viewer selects interaction with a subset of the representations of real-world goods or services, the station airing the broadcast may select from amongst a range of commercials that may be best suited for that viewer. The commercial selected from the range of commercials may be played during an upcoming "open commercial" break that is specifically designed to allow for a variable commercial. Because the viewer 102a chose the car 120a, an advertisement with detailed information about the car 120a may be shown in the upcoming advertisement 114a (e.g., an open commercial break). An upcoming roofing service advertisement (not shown) with detailed information about the roofing service 120d may also be shown during another upcoming open commercial break. Similarly, the upcoming advertisement 114d with more information on the golf shirt 120c may be shown based on the viewer 102c having expressed interest in the golf shirt 120c by triggering interaction at the time the golf shirt 120c was shown in the content 112b. By determining that viewer 112b has triggered interaction with a specific product or service, an advertisement for the specific car or service may be sent during the next scheduled commercial break, rather than sending an advertisement for a product or service that the viewer may have no interest.

The open commercial break may be paid for by one or more advertisers and the advertisement may be a local or national advertisement. For example, viewer 102b may select interaction for the golf club 120b shown in the content 112b. The upcoming advertisement 114b may be a local advertisement for a local golf course while the upcoming advertisement 114c may be a national advertisement for golf equipment such as the manual golf cart 136. The national and local advertisers may share the open commercial break time slot 110. The national advertiser may pay of the portion 110a of the time slot 110 while the local advertiser pays for the portion 110b of the time slot 110. Local advertisers may take advantage of interests in nationalized products by focusing advertisements on the area served and the demographic that would be most interested in certain goods or services, enabling small businesses to leverage advertising dollars. Advertisers sharing a time slot may have a synergistic relationship based on synergy of respective products. Advertisers may receive discounts by splitting the advertisement time slot. Discounts may be negotiated by a publisher.

Content may be an advertisement. Similar to the example of representations of real-world products or services described in a context of a television show, the advertisements may present the viewers with cues that notify the person that there is an opportunity to interact with the content in the advertisement. For example, a cue 126c may be shown in the advertisement 114c. The viewer 102b may have interest in the manual golf cart 136 shown in the advertisement. The interaction of the viewer 102b with the representation 136 may cause further information to be provided to the viewer 102b or a third party recipient. For example, a viewer may receive an email with details of the product or service associated with the selected cue. The email may be sent to a viewer's account as part of a system for in which recipient interaction with a content stream is enabled according to embodiments disclosed herein. The email may include information such as the scene being viewed at the time the cue was shown, and the time for when the cue was shown may also be included relative to starting time of the show. The email may include a link to a web site for the product or service, a link to view a clip where the product and cue appeared, a link for rating the episode in which the product and cue appeared, or a link to a custom portal. The custom portal may be automatically updated to track each cue selected by a viewer enabling the viewer to view or act on the cue at a later time.

As described herein, a product or service "advertisement" is the product or service placement itself. The advertiser may receive immediate feedback from viewers of the content as to how many persons are interested in a product. In addition, viewers are enabled to buy, share, and rate the content providing feedback at a new level. For example, focus groups become the entire viewing population. According to embodiments described herein, advertisers may leverage an entire subscription database and subscriber actions may help determine what subscribers like and don't like in real time.

By the simple action of pushing a button or enabling an "app", viewers may "pull" advertisements according to interests. Advertisers do not need to guess at what a viewer's interests may be. Rather, countless products, services, and information within content are made available for a viewer to query. Viewers may interact with program content when they see a product that piques interest at the time that the viewer sees it. The viewer's impulse to react is satisfied as the viewer may immediately take action when the viewer sees a product (good or service) of interest, without affecting others from sharing the visual or audio content stream.

Instead of hoping that a viewer may subconsciously remember a product seen or heard in a content stream the next time the viewer is online, at a store, or in a mall, embodiments disclosed herein may enable the viewer to immediately interact and to interact in a manner that does not interrupt other viewers of the same content.

The cue, alert, or notification that the user has an opportunity to interact with content is part of the show or advertisement, just as the representations of real-world objects or services are part of the show or advertisement. When the viewer triggers an interaction, they are doing so because they want information regarding the product or service.

Multiple parties may make money according to embodiments disclosed herein. Content producers and distributors may sell the rights to place cues into the delivered content, guaranteeing that the advertisers will reach an appropriate target audience. The content producers and distributors may sell the rights to add a cue to existing "produced" commercials, enabling viewers to immediately purchase or review an advertised product. The rights may be sold to manufacturers, retailers or even advertising companies themselves. The content producers and distributors may sell collected data regarding opinions, polling, ratings, and reviews to various data collection facilities or directly to the involved parties. "Voting" for reality talent shows could be sold to networks to replace current systems and dramatically improve participation and results. Enabling cue interactive advertising may cut back or replace expensive production ads and may easily be leveraged in order to sell services. Further, enabling cues for gaming or social interaction may be packaged, enabling additional programming to be sold to a recipient (e.g., end user).

Figure 1B:
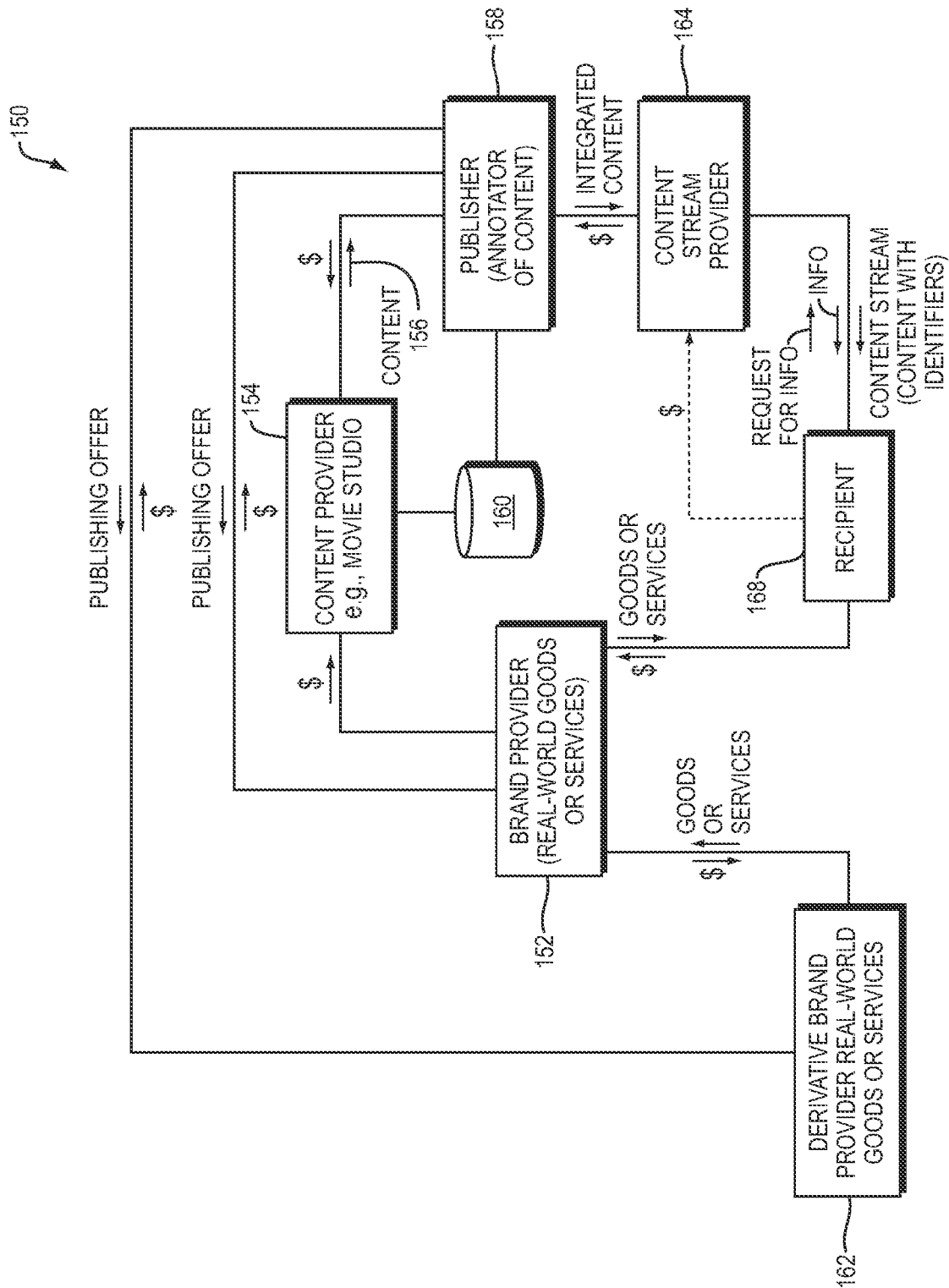
FIG. 1B is a block diagram illustrating multiple parties with interest associated with recipient interaction with a content stream.

FIG. 1B is a block diagram 150 illustrating multiple parties associated with recipient interaction with a content stream. Exchanges between parties may include a "$" notation that may reflect an exchange of cash, advertising for cash or credit payment, purchasing of products for cash or credit, etc.

Companies invest thousands of dollars in television and movie productions in order to have viewers see the companies' products. A brand provider 152 may be a company, manufacturer, distributor, or retailer of real-world goods or services. The brand provider 152 may pay a content provider 154 (e.g., movie, TV, music production studio) product placement fees for products or services used in the production. The content provider 154 may produce content 156 that includes product placement. A product placement database 160 may be populated by the content provider 154. The product placement database includes information for the point in time that product placements appear.

The product database 160, described below in reference to FIG. 1C, may contain information associated with every product placement and pertinent piece of information regarding the content itself. This database may include, but is not limited to the content information itself (production information), names of the products or information, information associated with a manufacturer, time or times within the produced content where the product or information occurs, amount of time the product or information is presented on the screen, categories in which the products or information should be considered (sports, finance, product line, vendor, etc.) and any other data that may be used in researching the product or piece of information. Additionally, applicable demographic and interest data for the product may be added. The publisher

158 may combine the produced studio content 156 with the product placement database 160 in enable the cue or other indicator to be presented to the viewer at the same time that the corresponding product placement is being shown.

The publisher 158 may associate identifiers with at least a subset of the representations of real-world objects or services in the produced content 156. For example, the produced content may be merged with the product database to create a dynamic integrated content stream. Within this stream, the product placements may be linked to the appropriate scenes or times within scenes using the time stamp as the control. An identifier such as an indicator field may be added to each record in the stream that may be set to "ON" or "OFF" to enable or disable interaction prior to airing to indicate whether or not interaction associated with the product placement is active.

The publisher may take the integrated content with the identifiers and offer the brand provider 152 or a derivative brand provider 162 a publishing offer to enabling interaction with a viewer. For example, the publisher 158 may sell an advertising opportunity to the brand provider 152 or the derivative brand provider as an added opportunity for capturing viewer interest. The content with the identifiers may be referred to herein as cued content, annotated content, integrated content, combined content, or a dynamic integrated content stream.

The cued content may be marketed back to the original parties that place the product or to related parties. The cued content may be used for polling, voting, and rating purposes as the cue can also be applied to non-product data. The advantages of the cued products may be an easy sell to parties who already have invested in the content through product placement. If the advertising opportunity is purchased by a brand provider, an identifier may be activated by enabling the identifier by setting the identifier to "ON" for the brand provider, or activating the identifier in any other suitable manner.

The cued content may be offered to a content stream provider 164 that provides a broadcast service to viewers 168 that subscribe and pay the content stream provider 164 for the broadcast service. The content stream provider 164 may pay the publisher 158 in order to offer the dynamic integrated content stream to viewers. The content stream provider may benefit as a number of paying subscribers may increase due to recipient interest for enabling of recipient interaction with a content stream. Distribution to recipients' wireless enabled devices may occur through the recipients' wireless carrier. Various carriers may act as a pass thru for content to the devices and requests back to the content provider on individual indicator data. A recipient 168 may purchase real-world objects (e.g., goods) or services from the brand provider 152 or another party based on an interaction precipitated by the enabled identifier.

Figure 1C:
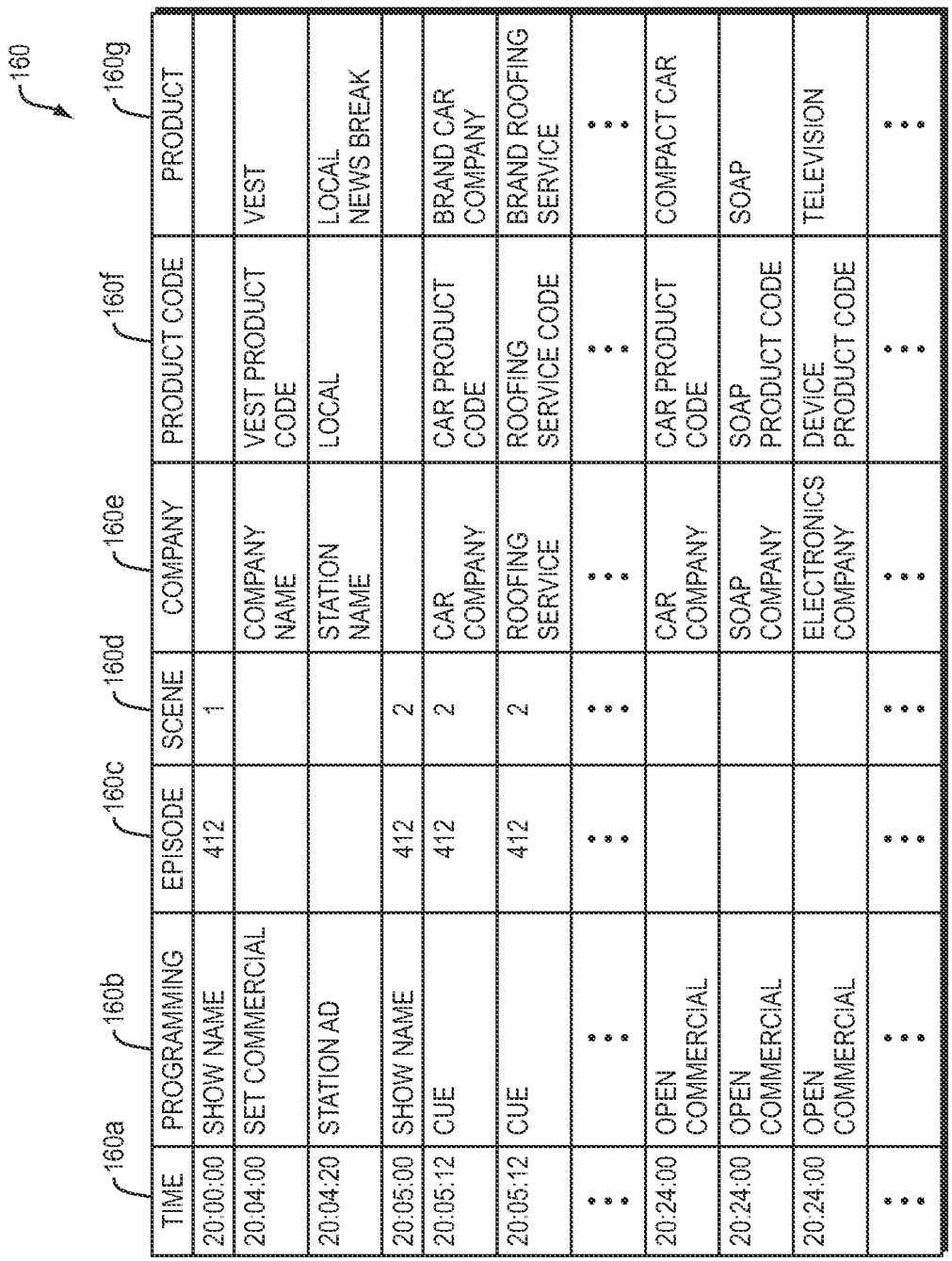
FIG. 1C is a table that shows an example of an embodiment of a product placement database.

FIG. 1C is a table that shows an example of an embodiment of a product placement database 160. The product placement database 160 may include information such as the name of the programming 160b, episode 160c, scene 160d, company 160e, product code 160f, and product 160g, being shown at the time 160a. A publisher 158, shown in FIG. 1B, may take the produced studio content 156 that includes various paid product placements and combine the produced content 156 with the product placement database 160 that includes information for the point in time that the paid product placements appear.

Figure 1D:
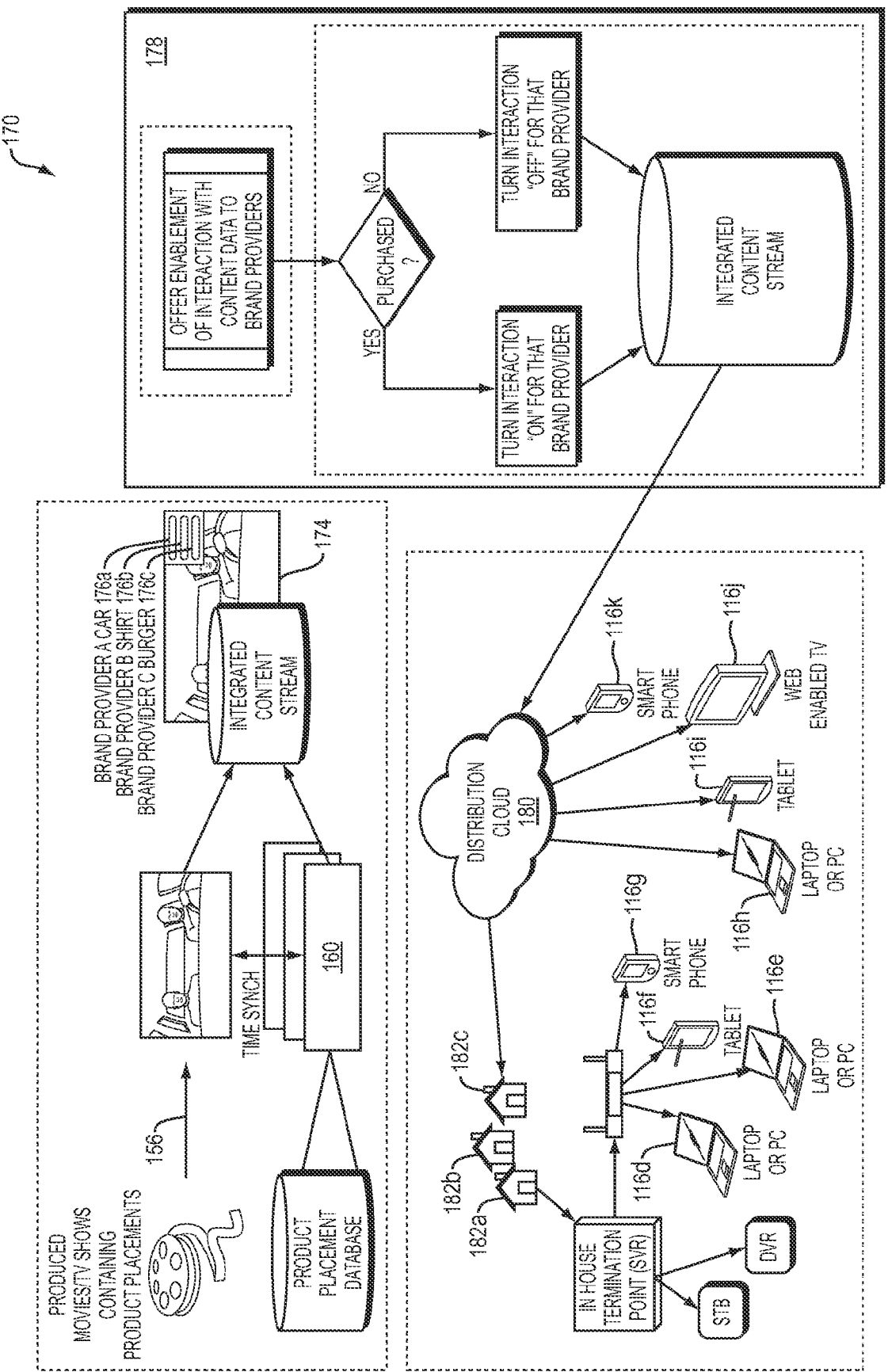
FIG. 1D is a diagram of a system for enabling recipient interaction with a content stream.

FIG. 1D is a diagram of a system 170 for enabling recipient interaction with a content stream. The system combines product placement data 160 with the content 156 and adds identifiers in order to enable activation of a cue to show up on a viewers' personal displays 116a-h at an appropriate time. For example, a scene 174 shows three cues that are activated for brand providers A, B, and C. Activation of the indicators 176a-h may be based on whether or not the corresponding brand provider accepted an offer of enablement of interaction with content data (178). If a vendor accepts an offer for airing the cue then the corresponding cue may be turned "ON" and be visible or audible to a recipient at an appropriate time corresponding airing of a corresponding product placement that may be visible or audible.

The integrated content stream with identifiers that may be enabled or disabled may be sent or delivered to recipients via various content distributors 180 for use on a variety of devices 116d-k both in out of homes 182a-c. If outside of a home, a viewer may be enabled with a roaming mechanism that enables the viewer to track cues on any device located within a specified proximity. A viewer may use a device including a Global Positioning System (GPS) to select a show for viewing. The show may be selected from a list of shows that is generated based on the viewer's location and based on whether or not a show is cued. Cues, notifications, and choices of cues or notification may be displayed on the viewer's device rather than a publically viewed television.

A viewer may select from a list of enabled cues as well as a list of actions that correspond to the enabled cues. Actions may include an option to shop, share, rate, or get more information regarding a product or service. A viewer may have custom settings that correspond to the viewer's preferences for the particular cue.

During news shows, political debates or other social programming, a viewer may use a cue to answer polling questions from a sponsor, the network, or any other third party that may pay for the service.

The cues may be used for interaction with TV reality shows. For example, instead of texting a vote, a viewer may vote for a contestant by pressing a button when an appropriate cue is visible. A number of votes for each contestant may be monitored based on viewer's user profiles.

Interaction may be controlled by multiple devices and have multiple actions defined based on a viewer's cue configuration as well as a fully customizable set of viewer preferences. For example, an interaction may include an action to buy, rate, vote, share, text message, email, view a website, receive content information, or any other suitable action such as updating a viewer's custom portal A viewer's custom portal may present a viewer with a custom welcome page that may list the products or services associated with cues selected by the specific viewer. The custom portal may enable viewers to select and customize unique cue profiles. A cue profile may include list of cues sortable by any header. A cue header may include the name of the product or service, as well as a category, price, and context for the shown product or service (e.g., commercial name, show name, episode name, episode number, etc.). Further, the portal may enable a viewer to look up an episode to see what other cues are activated in the content as the viewer may be interested in other products or services. The viewer may select a cue and buy, share, rate, or request further information on the product or service.

From the custom portal a viewer may view the viewer's user profile. The user profile may provide the types of product content or services that were associated with the cues that the viewer selected. For example, the user profile may provide the viewer with percentages related to categories or products primarily selected based on cues such as sports, automobiles, consumer electronics, men's clothing, women's clothing, tools, etc. Based on frequency of user interaction associated with specific types of cues, a recipient may be sent more identifiers associated with representations of real-world object or services for those categories as well as more commercial content related to those categories. As a user develops a custom profile, the system may display or suppress various categories of cues so that the viewer does not need to see cues or commercials that do not interest the viewer, enabling more effective and more targeted advertising.

Figure 2:
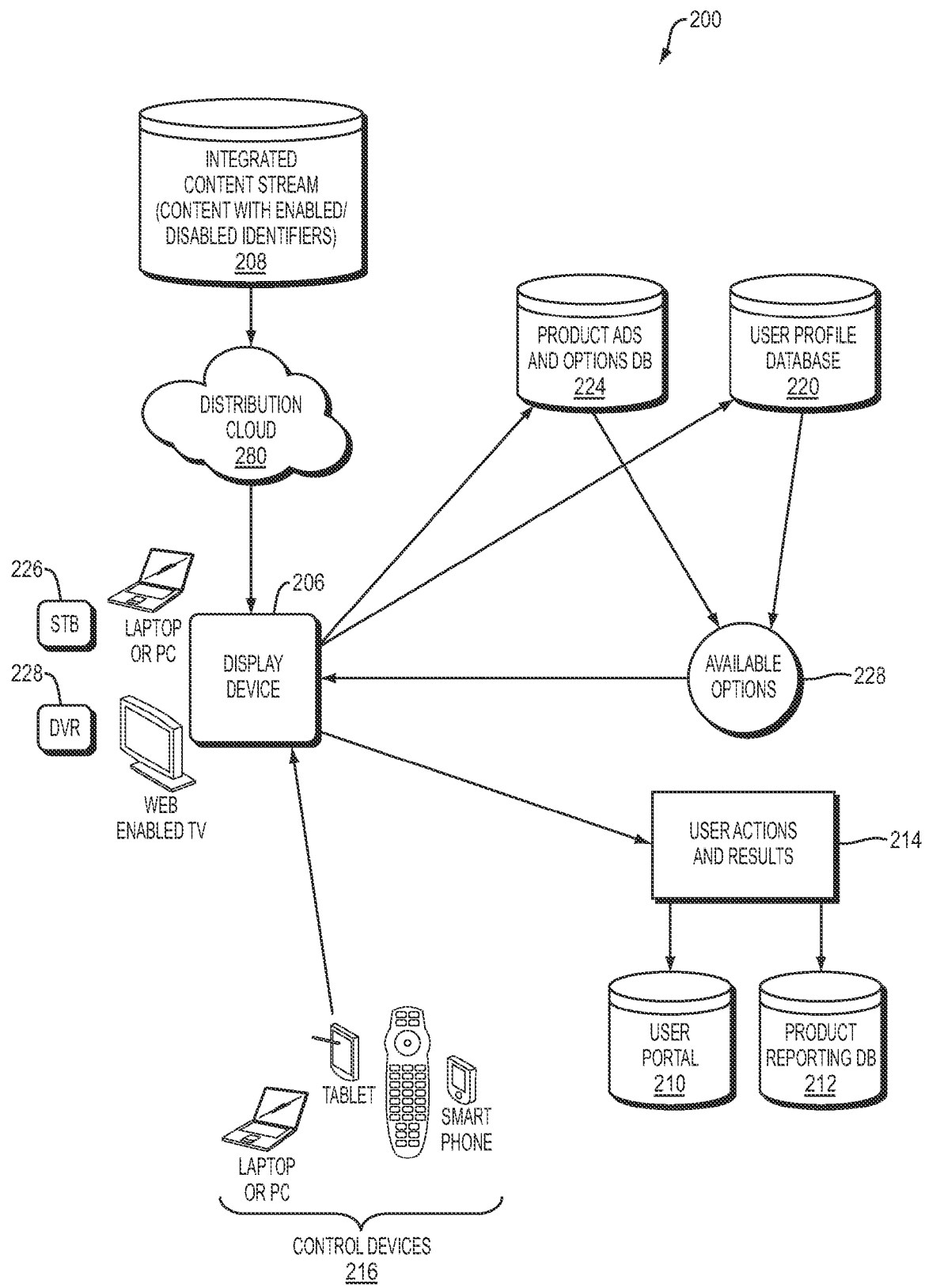
FIG. 2 is a diagram of an embodiment of a system for enabling recipient interaction with a content stream.

FIG. 2 is a diagram 200 of an embodiment of a system for enabling recipient interaction with a content stream. Produced content may be combined with product placement data and index on a many to one aspect using a timestamp. Cue data may be added that includes control data regarding how a cue icon may be displayed, various options that may be acted on by a user, expiration date for the cue data that may be relevant for time for content that may be recorded on a DVR device (e.g., in a case of time sensitive polling or voting as well as short term product promotions), and any other pertinent data that may be used for acting on or tracking viewer interaction. The integrated content stream 208 may be offered to various product and service vendors that may have a vested or potential interest in the content. If a vendor chooses to pay for the interaction, a corresponding cue or identifier may be set to "ON," enabling a cue icon and associated available actions to be available at the point in the content that the vendor's product or service is in view. If the vendor chooses not to purchase the opportunity, the corresponding cue may be set to "OFF." The compilation of the original content with cue data may be referred to herein as cued content, an integrated content stream, an integrated content stream with identifiers, or an integrated content stream with enabled/disabled identifiers 208.

The integrated content stream may be delivered through various levels of distribution in the media chain. The integrated content stream may reside within a distribution cloud 280. The integrated content stream 208 may be housed within a distribution center (not shown) that may act as a collection point for cue interactions as well as a central processing point for actions such as web redirection, email, SMS, polling and vote collection, ratings, and other suitable data collection. The integrated content stream 208 may be delivered to a location that may include a local content server (not shown), enabling data to be cached locally to improve data transfer performance. The distribution center may store the various product advertisements and information and have access to the user database in order to make determinations on the types of content each user prefers to view or not view. The distribution center may include an update module or engine configured to update the user portal 210 and track any user updates or actions 214.

As viewing of the integrated content stream progresses, the integrated content stream may reach a point that includes a cue or indicator that is set to "ON." The indicator system may check the user's profile database 220 and may determine if the specific user has data in the user's corresponding user profile that may suppress the cue, such as an icon, from being displayed. The user profile may be dynamically updated based on historical actions of the user as well as preferences that the user may have configured in the user portal 210. User configuration may be updated by the user at any time. If the user profile in the user profile database 220 does not suppress the cue, the cue may be displayed to the user either on a central screen or on a separate, associated user device 216 that may have an identification that is unique to the individual user. A location and behavior of the cue may be determined based on selections made during creation or integration of the integrated content stream.

If a user has an interest in a product from the integrated content stream or wants to take part in rating, voting or answering a polling question that may be presented, the user may activate a cue by pressing an appropriate button on a personal remote control, clicking an icon on a laptop or personal computer (PC), or activating an "app" on a tablet, smart phone, or other suitable control device 216. User devices or applications may be configured to be communicatively coupled to access a users's profile and uniquely identify the user.

If a cue is activated, a product ads and option database 224 may include options. For example, options may identify what product(s) or actions(s) to display to a user, a specified order for displaying the product(s) or action(s) or more than one is identified, a location for displaying selections, a time for displaying the selections, secondary actions that may be available, or any other suitable option that may be relevant to the product, service, or question being displayed.

Once product options have been determined, the system may filter the options based on the user's profile in the user profile database 220. If there are multiple potential actions for a product but the user's profile is set for only one default action, only the user's default action may be taken. If the user's profile includes no restrictions regarding a type of content to display or actions to take, the options determined based on the product being presented may be activated. The user may modify the user's profile at any time to allow or suppress actions, set precedence or set defaults based on a location or a type of device.

A system may display products, services, and/or questions may based on information in the product 224 and user profile 220 databases and may display on either a shared display 206 (e.g., television screen, monitor, movie screen, etc.) or directly on a user's personal smart device 216. The system may accept responses, process the responses, and display subsequent screens or selections based on the product and user profile databases (228).

The system may collect the actions, opinions, or answers of a user and combine actions, opinions, or answers of the user with content information and timestamps enable an action determined by user input or a default action as defined by the user's profile. The action may include sending an email, SMS text, redirection to a variety of websites, tallying of votes, opinions, ratings, or answers to questions. The action may be defined by the integrated content stream and may be any combination of actions.

After completing the actions, the system may update the user's profile. A user may be enabled to view historical data regarding the cue selected, other cues that a user may have missed within the same or related content, the content itself that the had viewed, and any other suitable data related to the content, products, or actions that the user may have interacted with. In addition, the user may be enabled to take further action on cues that the user chooses not to at the time the cue was viewed by the user. The user may decide to go to the product website for additional research or purchase, rate the content or the product itself or share product interests, opinions, or other information with a social network. In addition, a user may view and update the user's user profile from within the user portal to enable more, less, or different products to be displayed, set defaults for actions or change demographic information.

Once actions for a cue have been completed, the system may update the product reporting database 212 so that the production company, content distributors, advertisers, and other interested third party subscribers may retrieve a wide variety of pertinent and current data regarding the performance of products and the content itself. This reporting data may be available real time enabling decisions to be made as quickly as possible. Such timely decision making may enabled content distributors and advertisers to switch out upcoming commercials, alter a direction of live programming, enable additional cues to gather more or different information or even change the actions of a current cue to give more, less or different options to a viewer in real time.

Figure 3A:
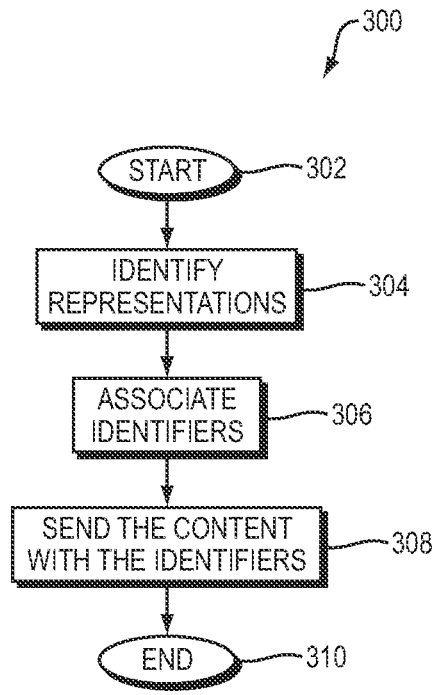
FIG. 3A is a flow diagram of an embodiment of a method for enabling recipient interaction with a content stream.

FIG. 3A is a flow diagram of an embodiment of a method for enabling recipient interaction with a content stream (300). The method may start (302) and identifying representations, of real-world objects or services in content, to be sent to a recipient via the content stream (304). The method may associate identifiers with at least a subset of the representations (306). The method may send the content with the identifiers to the recipient in a manner enabling the recipient to interact with the subset of the representations via the identifiers, interactions by the recipient causing information, selected based on the identifiers, to be provided to the recipient or a third party recipient (308) and the method may end (310).

Figure 3B:
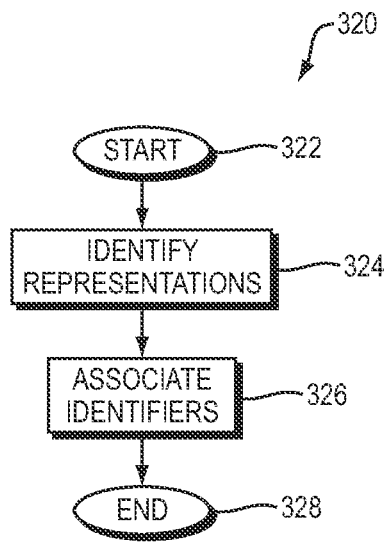
FIG. 3B is another embodiment of a method for enabling recipient interaction with a content stream.

FIG. 3B is another embodiment of a method for enabling recipient interaction with a content stream (320). The method may start (322) and identify representations, of real-world objects or services in content (324). The method may associate identifiers with at least a subset of the representations, to be sent with the content to the recipient via the content stream (326) and the method may end (328).

Figure 3C:
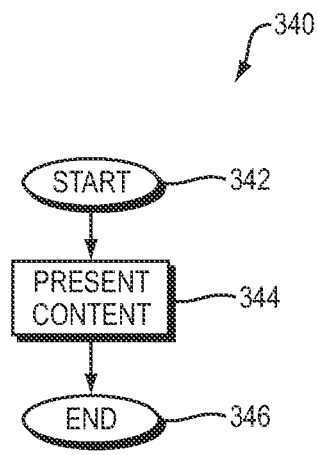
FIG. 3C is another embodiment of a method for enabling recipient interaction with a content stream.

FIG. 3C is another embodiment of a method for enabling recipient interaction with a content stream (340). The method may start (342) and present content to the recipient in a manner enabling the recipient of the content stream to interact with representations, of a real-world objects or services in the content stream via identifiers associated with the representations, interactions by the recipient causing information, selected based on the identifiers, to be provided to the recipient or a third party recipient (344) and the method may end (346).

Figure 3D:
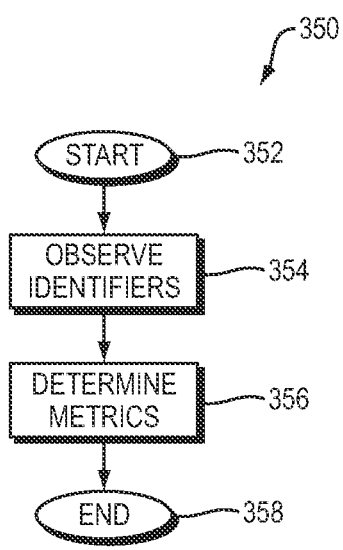
FIG. 3D is a flow diagram of an embodiment of a method for providing information targeted to a specific recipient.

FIG. 3D is a flow diagram of an embodiment of a method for providing information targeted to a specific recipient (350). The method may start (352) and observe identifiers associated with representations, of real-world objects or services, in a content stream (354). The method may determine metrics associated with the identifiers observed (356) and the method may end (358).

Examples of metrics may be a number of user interactions per show, a number of user interactions per item, a number of user interactions per type, demographics per show, time slot, and interaction type. Metrics may be ratings per show including a demographic. Metrics may be answers to given questions via cues, a number of times specific cues were not selected, endpoints of user interaction (email, product website, social website, etc.) and "later" transactions performed from the user portal.

Figure 4A:
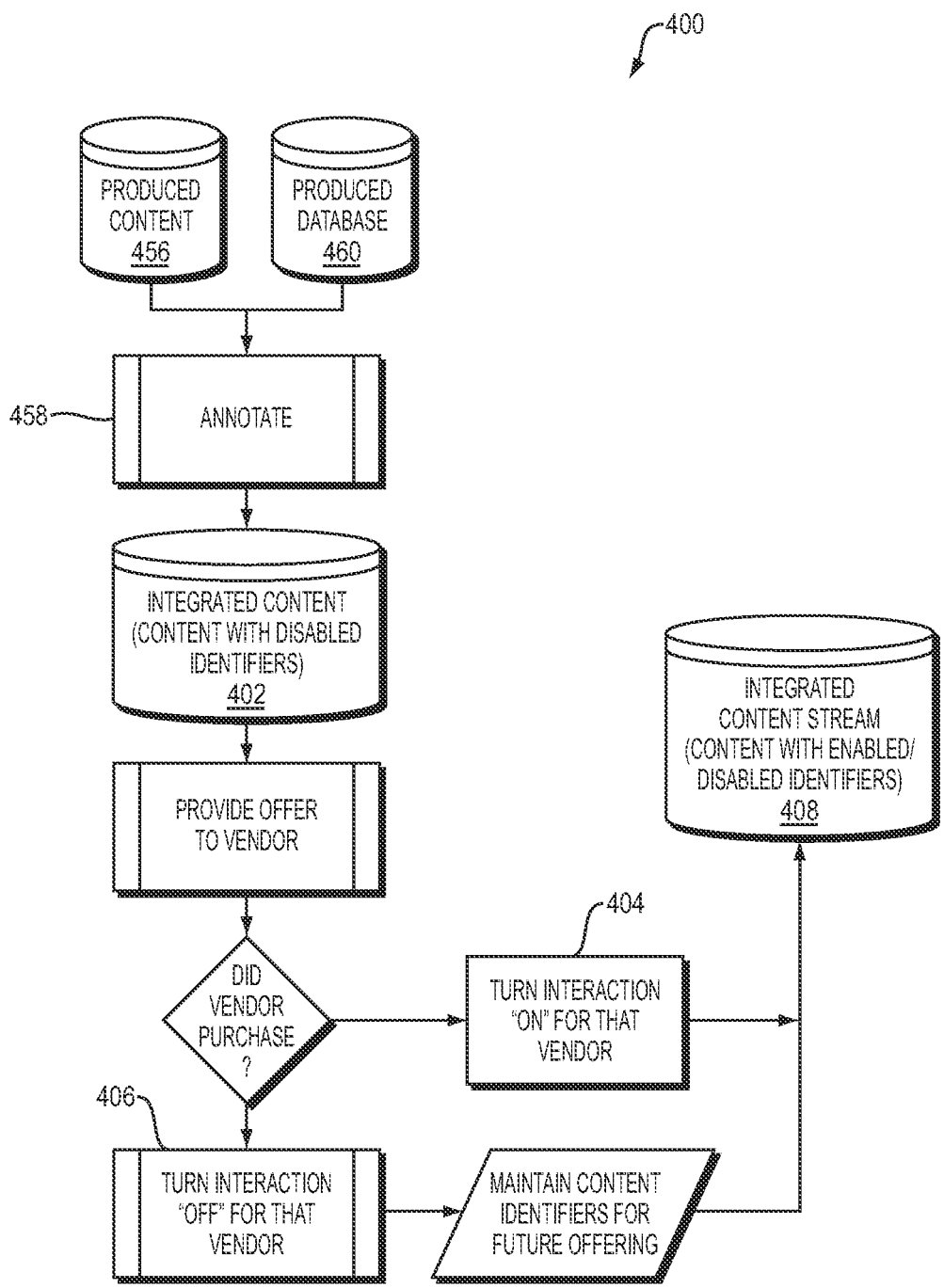
FIG. 4A is an embodiment of a flow diagram for creating a content stream.

FIG. 4A is an embodiment of a flow diagram 400 for creating a content stream. Produced content 402 is the final production run of a TV show, movie, concert, live broadcast, radio broadcast or any other form of entertainment that can be seen or heard on an electronic device including, but not limited to television, personal computer, smart phone, tablet or radio. This content can be broadcast live or prerecorded. The content may contain product placements that are either free or paid for by the brand provider (e.g., product manufacturer, distributor, retailer, or vendor) that are meant to promote the product in some way. In the case of content with no commercial product placements, embodiments disclosed herein may supply information regarding the content itself (subject matter, participants, references, production information, etc).

A product database 460 may contain information associated with every product placement and pertinent piece of information regarding the content itself. This database may include, but is not limited to the content information itself (production information), names of the products or information, information associated with a manufacturer, time or times within the produced content where the product or information occurs, amount of time the product or information is presented on the screen, categories in which the products or information should be considered (sports, finance, product line, vendor, etc.) and any other data that may be used in researching the product or piece of information. Additionally, applicable demographic and interest data for the product may be added. This data is used at a viewer level.

The produced content may be merged with the product database to create a dynamic integrated content stream (458). Within this stream, the product placements are linked to the appropriate scenes or times within scenes using the time stamp as the control. An indicator field, also referred to herein as an identifier, may be added to each record in the stream that may be set to "ON" or "OFF" prior to airing to indicate whether an interactive element associated with the product placements is active. Identifiers may be added in any suitable manner, such as metadata.

An expiration date for the interactive element in the case of time sensitive polling, voting or products may be applied. For example, the expiration date may be useful when watching recorded content. Each and every product or piece of information that may be requested by a viewer has an indicator. For instance, a product vendor may not pay for an interactive element notification and resulting advertising for the first airing, but may in fact wish to purchase it at a later date. Likewise, a vendor who paid for the indicator element on the original airing may decide not to purchase it for subsequent airings or in other media releases. Thus, interactive element and indicator is dynamically controlled at the national, regional, and/or local levels. Such dynamic control enables commercials, polling and other information interaction at all levels.

The indicator, when set to "ON", may trigger an embedded integrated icon (interactive element) to appear in a predetermine location of the viewable area that may be configured by the content provider to allow for the most effective placement for the particular scene or background.

The resulting integrated content is available to be marketed to product placement vendors, distributors or other parties (402). At this point the indicator would be set to "OFF". The content could be aired in this state; however, no indicator/interactive element notifications occur during the "OFF" state.

If the product vendor decides to activate indicators associated with the vendor's products, the indicator for that particular product, service, polling question, etc. would be set to "ON" (404). For general content information, such as actor information, production statistics, location information, indicators may be set to "ON" or "OFF" states at the discretion of a production company, network, service provider, or any combination of parties.

If the indicator is set to "ON", a notification will appear on a configured device at the appropriate time to notify the viewer that there is a product or piece of information that may be viewed. If the indicator is set to "OFF" nothing for that product or piece of information will appear (406). The indicator may be maintained for future offering. For example, an embodiment may determine metrics associated with attempts at interactions with disabled interactive identifiers corresponding to the representations, of real-world objects or services in content, by the recipient of the content stream. Further the embodiment may offer to enable interaction with the representations, of real-world objects or services in content, to entities involved with commercial use of objects (e.g., goods) or services by demonstrating value based on the metrics.

Once the identifiers have been added to the content and activated, the integrated content stream is ready to be aired. The content stream 408 may be housed at the network distributor responsible for the area of distribution.

Figure 4B:
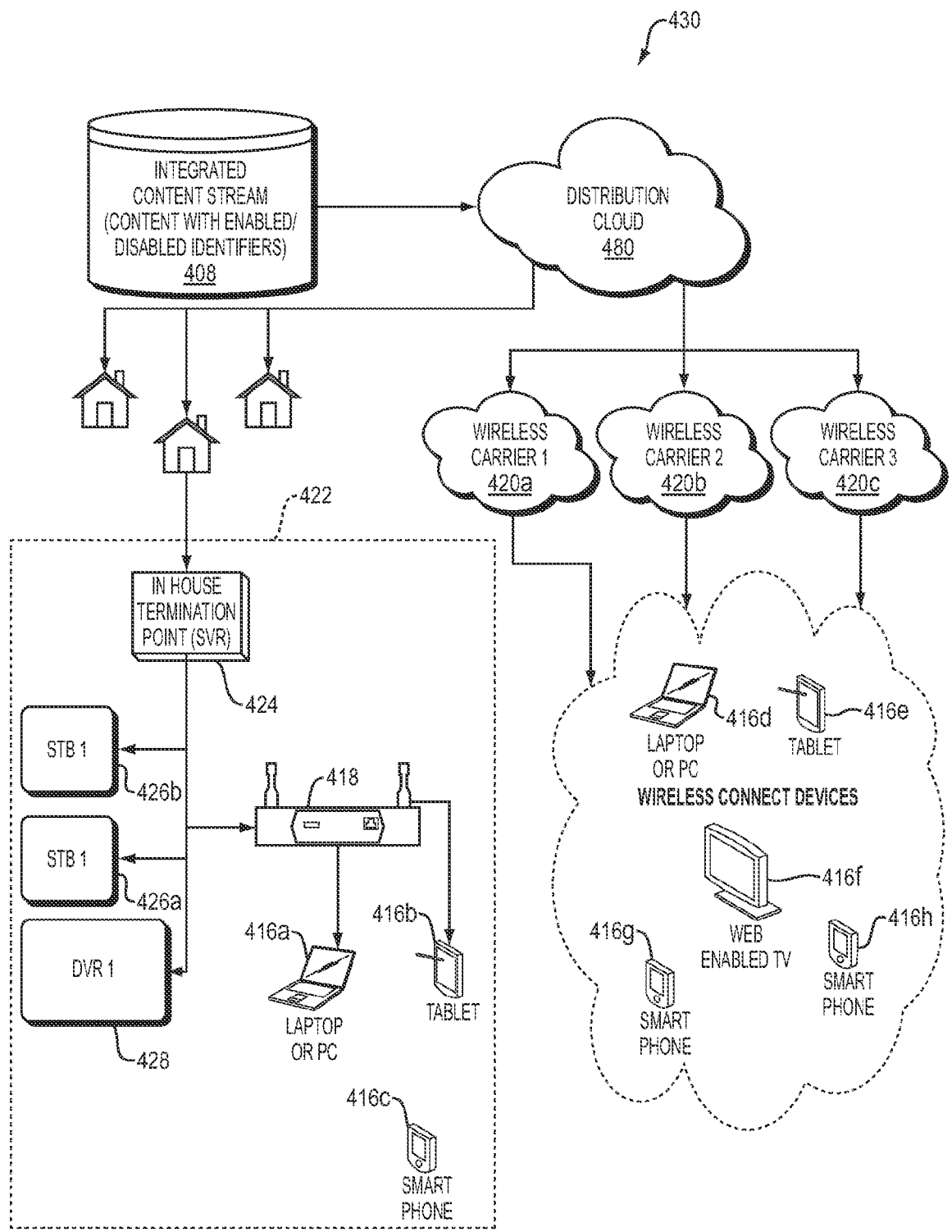
FIG. 4B is a flow diagram for delivery of the content stream.

FIG. 4B is a flow diagram 430 for delivery of the content stream. Similar to a normally scheduled program, the cued content may reside within a distribution cloud 480. Streaming of the integrated content 408, signaling for the indicator icon to appear, collection of user actions and the returning of data as well as any other desired action (email, SMS text, social media updates, etc.) may be controlled through a centralized distribution point. The indicators may be controlled based on which product indicators are purchased (i.e., activated) as well as the end viewer's configuration.

Embodiments of methods disclosed herein may determine when an whether or not to display the cue, also referred to herein as an indicator icon, based on an indicator field within the integrated content stream. Embodiments of methods disclosed herein may determine where on the screen to present the icon based on the data within the content stream. Embodiments of methods disclosed herein may process feedback signals from a device that is being used for the interaction. Embodiments of methods disclosed herein may determine the type of device sending the feedback and a type of response format to return to the device (e.g., screen configuration, control mechanisms).

Embodiments of methods disclosed herein may determine the product an indicator is triggered for and options that exist for that product based on the data with the content stream. If multiple products exist for the selected indicator, a determination is made as to which products to display, in what order, and where to display them on the screen. Embodiments of methods disclosed herein may determine the product options to display based on a profile for a current user. Embodiments of methods disclosed herein may combine both the product and user options to make a determination as to which products to display on the screen. Embodiments of methods disclosed herein may process the feedback signal from the device that determines which product is being selected. Embodiments of methods disclosed herein may determine the available actions based on the content stream and the users' profile and then display the options. Embodiments of methods disclosed herein may process the feedback signal for the action choice if necessary. Embodiments of methods disclosed herein may pause the content stream if appropriate for the action that was selected, take appropriate action (e.g., email, screen pop, etc.), send a notification, based on a user's configuration, back to the appropriate device. Embodiments of methods disclosed herein may resume the content stream if paused, update user portal databases, or update product/vendor databases.

Distribution to wireless enabled devices 416d-h may occur through the viewer's wireless carrier. Various carriers 420a-c may act as a pass thru for content to the devices and requests back to the content provider based on individual indicator data. An end user network 422 may include a localized server 424. The server 424 may cache information such as the integrated content stream, a catalog including cue product information, local user profiles, data points regarding cue activation and interaction, as well as ratings, polling results, and action results that may be batch uploaded to the profile, user database and product database. In addition, the local server 424 may be configured as a distribution point for non-television devices such as smart phones, tablets, and PCs that may connect to the local server via a wireless or wired connection.

The end user network 422 may include one or more set top boxes (STBs). The set top boxes (STBs) 426a and 426b may be configured to display and filter integrated content as well as enable for one or more radio frequency (RF) devices 418 to respond to cues based on a corresponding unique profile. STBs may be configured to display or suppress cue notification icons as needed. STBs may also be used as additional filters based on the end user (holding the remote) configuration in a similar manner that an STB programming guide can filter what it shows on the screen using "favorites."

The STBs 426a and 426b may be configured to respond to multiple remote controls that have been uniquely encoded for a specific user. The remote control may be a standard remote control provided by a distribution company that includes a programmable key that can be used for the indicator system, custom indicator remote, smart phone or tablet that may contains an indicator "app" to control the STB and the associated indicators.

The end user network 422 may include a digital video recorder (DVR) version 428 of the STB and the DVR 428 may be configured to have all of the functionality of the non-DVR STB and may also be configured to send data to the indicator system regarding the recorded programming being watched so that viewer statistics can be accurately updated. The DVR 428 may be configured to interact with the indicator system on a non-real time basis. The DVR 428 may be configured to filter time sensitive indicator notifications that may no longer be relevant such as time sensitive voting or products that are being marketed for a finite time period. For example, a filter may pick up the expiration on the product's data.

The indicator system may also be designed to interact with any smart phone, laptop or PC, tablet, or any other application enabled device that is developed in the future. The application enabled device may be configured to interact with the indicator system while the content steam is playing on the device or interact with the indicator system while the Content Stream is playing on another device. In a local environment (home or small business) this can be accomplished by synchronizing through the local network. This synchronization may enable the device to interact when the content as it is being viewed as a recording through a DVR. In this embodiment, the DVR may trigger the device when an indicator is available and control the interaction. The results are sent over the internet to user portals, user databases, and product databases.

The application enabled device may be configured to interact with the indicator system while at a remote location. This may either be at a private residence or a public viewing area that may have the indicator system. The application enabled device may be configured to query the indicator system with the users current location (via GPS) to determine if the program that is being viewed at that time is in the indicator system. If so, a distribution center may send notifications to the user's device over the internet and accept, process and return requests in the same manner as described above.

A decision regarding what indicators to display to a given viewer, what choices to use once an indicator is selected as well as what defaults are to be used is controlled by a personalized user profile. This profile is originally based on a survey taken by the user first signs up for the service. As the user chooses to interact with the integrated content, data is taken into account by the user profile in order to better define types of information that the user prefers.

This data, taken as a whole, may then be used to push or suppress product indicators, on demand advertising and other actionable items. In addition, the user may specifically request default actions, devices or products to show or suppress through the user portal. If the user profile has no data regarding either a specific product or the general product category, indicators may be queued up to be displayed. Once it has been determined which indicators are valid for the specific time period and the given user, a decision regarding how many indicators need to be displayed is made. If there is more than one product, the user will have to make a decision as to which indicator the user may be interested in.

If multiple indicators for a given time period have been sold by the studio, distributor or content retailer, a determination is made as to the order of the products on the output device. This may be a dynamic decision based on the order in which the indicators are place, the amount of money spent on the indicators or any other consideration content providers put in place.

Once the indicators have been determined and ordered, the system can turn "ON" the indicator icons to alert the viewer that a potentially interesting item can be viewed and acted on. Although the default output device is a television, the user can use any video display unit such as a PC, Laptop or Smart Phone to view the indicators.

The system may wait a predetermine amount of time for the user to select the indicator that the user wants to act on. This time limit may have a default, but may also be altered in the user profile as well. If the user does not make a decision within the specified period of time, an indicator list will be cleared from the screen. Additionally, if the user selects a "Cancel" option instead of choosing an indicator, the list is cleared from the screen.

Once an indicator has either been selected the system checks the user profile to see if the user has a default action selected corresponding to all indicator (update portal only, send SMS only, email information and update portal, etc.). If there is a default action, and that option is available for the selected indicator, the system will prepare take that action. If not, the system will put the list of applicable options.

If there is not a default action taken, the system will display the available options to the designated output screen and wait for a response from the user. Again, if no response is given within a designated time period, or if the response is to cancel the process, the screen will be cleared.

Regardless of whether a default or selected action is available, the system performs the action. Upon completion, the system updates both the user's portal information and the product database for historical purposes and further actions and reporting by both the user and the advertiser.

Figure 5A:
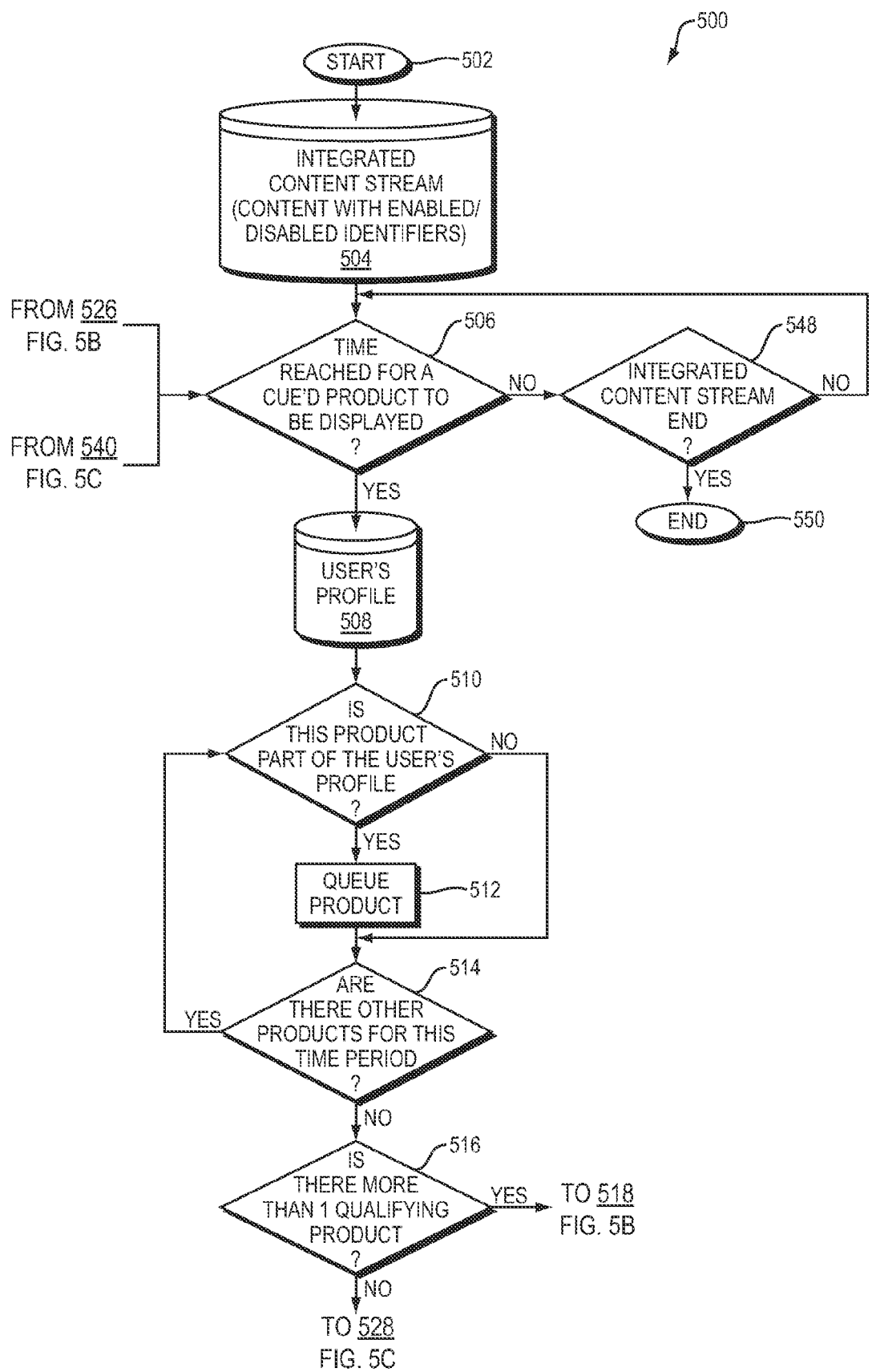
FIGS. 5A-5C are flow diagrams of an example embodiment of a method for display of an activated cue.
Figure 5B:
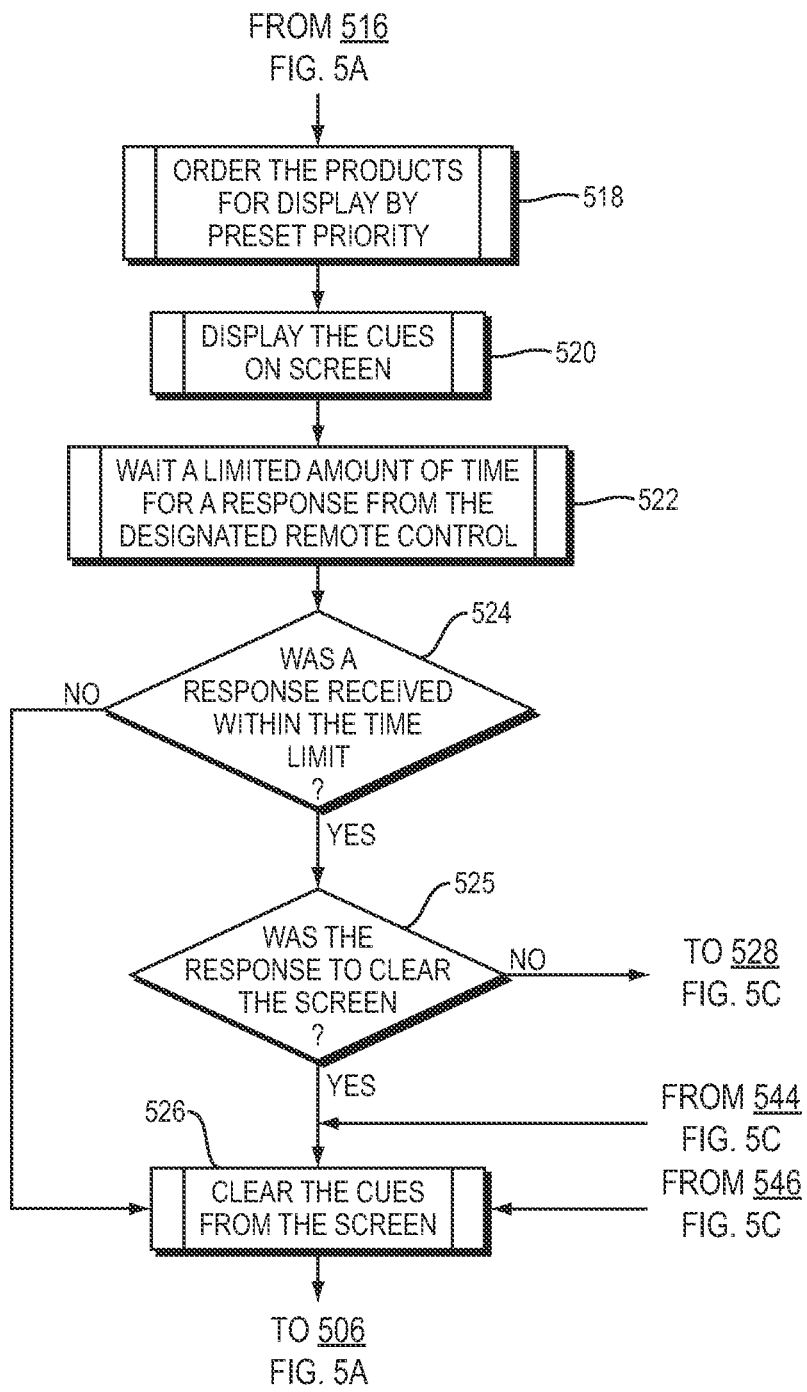
Figure 5C:
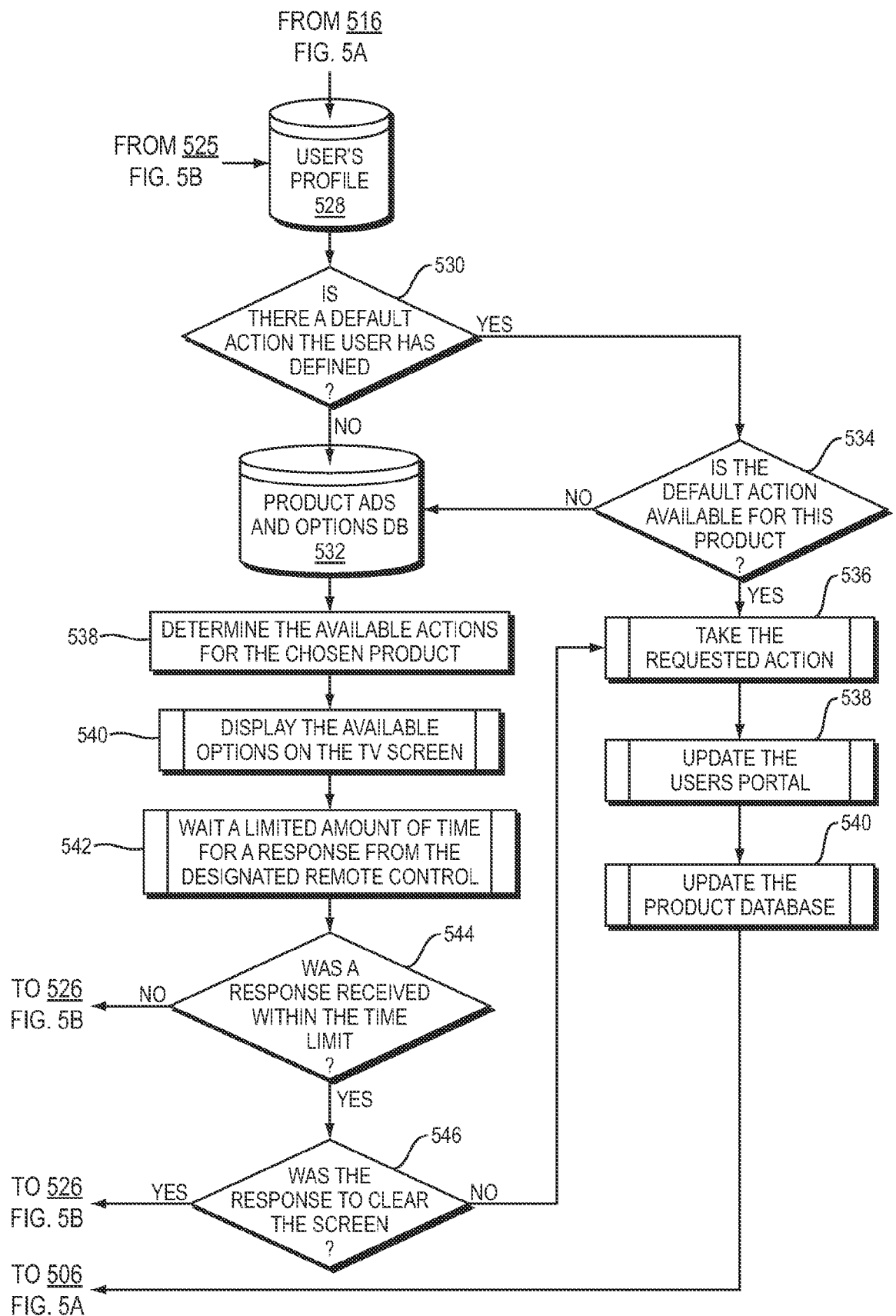

FIGS. 5A-5C are a flow diagram 500 of an example embodiment of a method for display of an activated cue. The method may start (502) with an integrated content stream (504). The integrated content stream may include identifiers added to content and activated, the integrated content stream being ready to be aired. As the content stream progresses along a viewing timeline, a time may be reached for when a product placement (actual physical product, informational item, question, rating request, or any other form of desired interaction for the given scene is available (506). For example, a third party may be represented by that placement that has purchased the opportunity to display a cue for a particular product at the time in the content viewing timeline.

A user's profile (508) may be used for decisions regarding whether or not to present a user with a cue (510). For example, the decision regarding what cues to show a given viewer, what choices to use once a cue is selected as well as what defaults are to be used will be controlled by a personalized user profile. The user's profile may be originally based on a survey taken by the indicator system when the user first signs up for the indicator service. As the user selects various programming, cues and actions, the user data may be taken into account to better define the types of information that the user prefers to see. This data, taken as a whole, can be used to push or suppress product cues, on demand advertising, and other actionable items. In addition, the user may be enabled to specifically request default actions, devices or products to show or suppress through the user portal. A query of the user profile database may be made to determine if the cue that is set to appear at this specific time is outside of the user's profile or specifically suppressed by the user (510). If data exists that would suppress the particular cue, the cue will not be presented. A check will be made for whether or not the given time interval in the content contains more than one cued product (514). If however, the user profile has no data regarding either the specific product or the general product category, then the cue may be queued for display (512). If the given time interval in the content contains more than one cued product, (510) and (512) may be repeated until a list of cued products for the given time interval have been processed.

After determining which cues are valid for the given time period and the given user, a decision regarding how many cues need to be displayed may be made. If more than one product is cued for the given time interval (period), a user query may be used to decide a set of one or more cues for selection that the user may be interested in (516). A user may be enabled to act on multiple cues if desired. If there is only a single qualifying cue for the user for the given time interval, a check of the user profile may again be made to determine if the user has a default action configured to take with all cues (528).

If multiple cues for a given time period have been sold, a determination may be as to the order of the products to be displayed on the output device (518). The ordering may be dynamic based on the sequential order in which the cues were placed, a comparison of an amount of money spent on each cue or any other consideration the content providers may put in place. From a database perspective, the ordering may be a preference rating stored in the integrated content stream. The user's profile may not have any influence on the order.

Now that the cues have been determined and ordered, the system can turn "ON" the cue to alert the viewer that a potentially interesting item can be viewed and acted on (520). Although the default output device may be a television, the user can use a PC, laptop or smart phone, tablet, or any other suitable device to view the cues.

A wait period of a predetermined amount of time for the user to select the cue that to act on may be implemented (522). The wait period may have a given default value, but may be dynamically altered in the user profile as well. A check may be made as to whether or not a user acted within the wait period (524). If the user does not make a decision within the specified period of time, the cue list may be cleared from the screen (526) and the method may return to (506). Additionally, if the user selects a "cancel" option instead of choosing a cue, the list may be cleared from the screen (526) and the method may return to (506).

However, if a cue has been selected, a check of the user profile may again be made to determine if the user has a default action configured to take with all cues (e.g., update portal only, send SMS only, email information and update portal, etc.) (528), similar as for the case of only a single qualifying cue for the user in the given time period. A check may be made for a default action (530). If there is no default action, a list of applicable options will be determined based on the product ads and options database (532). If there is a default action, a check will be made to determine whether or not the default option is available for the product (534). If the option is not available, a list of applicable options will be determined based on the product and options database (532). However, if the option is available for the selected cue, the requested action will be taken (536).

If there is not a default action taken, the available options will be determined (538). The available options determined may be displayed on a designated output screen (540) and a designated time period may be set to wait for a response from the user (542). If no response is given within a designated time period, or if a check for whether or not the response is to cancel the process (546) is positive, the cue list may be cleared from the screen (526) and the method may return to (506).

However, if a default or selected action is available, the action may be performed (536). Upon completion or the action, both the user's portal information (538) and the product database (540) may be updated for historical purposes, further actions, and for reporting by both the user and the advertiser. Upon completion of the necessary actions and updates, a wait period for a next occurrence of an activated (enabled) cue (506) may again be entered, and if a check for whether or not the integrated content stream has progressed to an end (548), determines that the integrated content stream has ended, the method may end (550).

Embodiments disclosed herein may solve a number of problems of advertising. A problem with current advertising is that it is unfocused. For example, current TV ads are based on large segments of demographics based on expected viewership. This type of traditional advertising is unfocused and unintelligent. The content of the show defines the basis of demographic for the advertisement. Like mass emails and snail mail campaigns of the past, this type of advertising has an expected low rate of success. The advertisers and agencies for the advertisers are limited to guidance from small "focus groups" to determine the effectiveness of the advertisements. This requires time and money on the part of the advertiser and yields results from a small percentage of the viewing population. The newest forms of advertising are still mired in the "push" world of content delivery. At best, advertisers can offer a choice of commercials based on a predetermined demographic. Further, local vendors cannot leverage national advertising to bring local viewers into stores. Being smaller and not as well funded as the national brands, local brands are guessing at the best times and shows to run advertisements and how to be as effective as possible.

Lost opportunities result from current advertising. For example, dozens, if not hundreds of products, both tangible and intangible are used in movies, prerecorded TV shows and live events. These products are "advertised" using millions of dollars worth of actors, sets and production costs. Viewers of current advertising cannot act immediately on a product or service seen in a television show or movie. This is a lost opportunity for the company that the product placement company may never get back. When a viewer does eventually see a commercial that interests them, the viewer's action is interrupted in order to act, or try to remember what the viewer saw hours later. Most likely, the viewer will not take any action until having seen the commercial multiple times. Further, DVR (all other media other than live) technology allows viewers to skip commercials. Commercial breaks during live events allow viewers to simply walk away. On purchased or rented video, ads are only at the beginning and can also be skipped after "x" seconds. In addition, some streaming media sources offer premium membership which allow members to skip commercials altogether.

Advertisers rating systems are outdated. For example, television ratings are based on a small, finite set of "Nielson Families" instead of a larger, more abstract demographic as additional technology is needed to collect this data. It is economically unfeasible to put a box in every household in America, let alone every household in the world that has a television. The Nielson box can only tell if the show is on, not if anyone is paying attention to specific scenes or products throughout the show. As a result, the data that is fed back to the advertiser is incomplete. There is nothing that tells the advertising company if the viewer is interested in a product, just that the commercial in which the product aired was turned on. DVR'd shows cannot be "rated" as there is no way for the Nielson box to know what is being watched, just that the viewer is on the DVR channel. As a result, the millions of people who record a show and watch it later are literally ignored my rating agencies. Further, the current rating systems cannot give enough real time data to make timely decisions. If a commercial is extremely popular, or worse, extremely unpopular, there is no way to provide that information back to the advertiser in order to allow them to either run the commercial again or make a substitution with another commercial.

In addition, there is untapped potential as live broadcasts of political, social or opinion based shows cannot get real-time, comprehensive feedback. Rather, pundits and after-the-fact surveys from a miniscule portion of a viewing audience may be relied upon to determine outcomes or effectiveness of the programs. The additional efforts in personnel, technology and analytics to gather feedback from a properly sized sample would be cost prohibitive. The popularity of viewer based voting shows has dramatically increased, but viewers still must call or text to vote. In addition, the percentage of viewers interacting with the shows is only a portion of total viewership. Viewers cannot "share" the specific interests regarding a show or its represented products without switching to another forum. There is no way to take what the viewer is currently experiencing and send the details to others in a seamless fashion. Viewers do not get the chance to "revisit" the things that interested them during a program at another time. As viewers move on to the next program or to the next task of a day, the product that interested them can simply be forgotten.

Embodiments disclosed herein may provide focused advertising. For example, embodiments disclosed herein enable the product's "advertisement" to be the product placement itself. The advertiser can get immediate feedback from every viewer of the content as to how many people are interested in a product (interchangeably referred to herein as a "good" or a "service"). In addition, the ability for the viewer to act on the placement (buying, sharing, rating) takes the feedback to an entirely new level. Focus groups may become the entire viewing population. According to embodiments disclosed herein, advertisers can leverage an entire subscription base and subscriber actions to help determine subscriber's like and dislikes in real time. The "focus group" becomes obsolete. According to embodiments disclosed herein, advertisements may be "pulled" by the viewer through the simple act of pushing a button or enabling an app. There is no guesswork as to what the viewer's interest may be. The countless products and pieces of information within the content are available for the viewer to query. Further, local vendors can take advantage of interests in nationalized products simply by taking part in the cueing opportunity. In addition, vendors can easily focus advertisements on the area that served and the demographic that would be most interested in a product. This allows small businesses to leverage advertising dollars.

Embodiments disclosed herein enable lost opportunities to be recaptured. Millions of dollars of product placement can now be leveraged by using the embodiments of a system disclosed. The work of creating an ad (e.g., advertisement) was already done by the production company, writers and actors. The cues, such as icons, enable the viewer to interact. Embodiments disclosed herein enable viewers to interact with the program content when the viewer sees a product (e.g., good or service) that piques interest at the time the viewer sees the product. The risk of losing the impulse to act is gone. Instead of hoping that the viewer subconsciously remembers a product the next time the viewer is at the mall. Embodiments disclosed herein enable the viewer to immediately take action when the viewer sees a product of interest. The cue is part of the show, just as the product it represents. There is no commercial that the viewer can fast forward through. When the viewer activates the cue, the viewer is doing so because the viewer wants the information regarding a product. This fact makes it valuable to them and even more valuable to the advertiser. The viewer can respond to a piqued interest simply by clicking a remote, launching an "app" on a smart phone or clicking a mouse.

Embodiments disclosed herein enable outdated rating systems to be replaced. For example, according to embodiments disclosed herein a system can capture every viewer within the service provider's area, giving real-time, intelligent feedback without additional equipment or administrative costs. Rating "families" are no longer a subset of the total audience, the "families" are the audience. As certain embodiments may track the viewer's response to products, the advertiser may be provided with more pertinent data about the return on investment as well as the most effective show placements.

The cue is embedded in the content. It tracks and reports feedback from any type of media including DVR, DVD and streaming content. With this level of information available, "when" the content is viewed no longer matters. The data provided to the affiliates is in real time and is complete. By knowing that the viewer has selected a cue for a product or service during a television program, the viewer can respond by sending a targeted advertisement during the next scheduled commercial break instead of sending an advertisement that the viewer may not be interested in. Embodiments disclosed herein enable an advertiser to increases product placement exponentially.

Embodiments disclosed herein may enable untapped potential to be realized. Embodiments of a system disclosed herein may be leveraged for political and social debates and forums. This would allow groups to get immediate feedback on the issues and debates while the debates were still in progress. In addition, as the embodiments disclosed herein may enable a system to encompasses the entire viewing audience, the results may be considerably more meaningful. The polling and voting ability of the embodiments disclosed herein enable real-time, demographic based feedback for game shows, reality TV and the variety of viewer-voting talent shows without the need to involve multiple wireless carriers. In addition, embodiments of a user profile described herein enable demographic information to be gathered with the votes.

Embodiments disclosed herein enable viewers to rate and share beyond what shows the viewers like. The viewer can comment about a product, song, actor or any other part of the content. Viewers can comment without ever leaving the show. Embodiments disclosed herein enable a user portal to track viewers' interactions, enabling viewers to expand on actions and interests and enable them see what other opportunities viewers may have missed during the showing of the program. The portal may even shows cue in the context of the show the viewer originally experienced it in.

Figure 6:
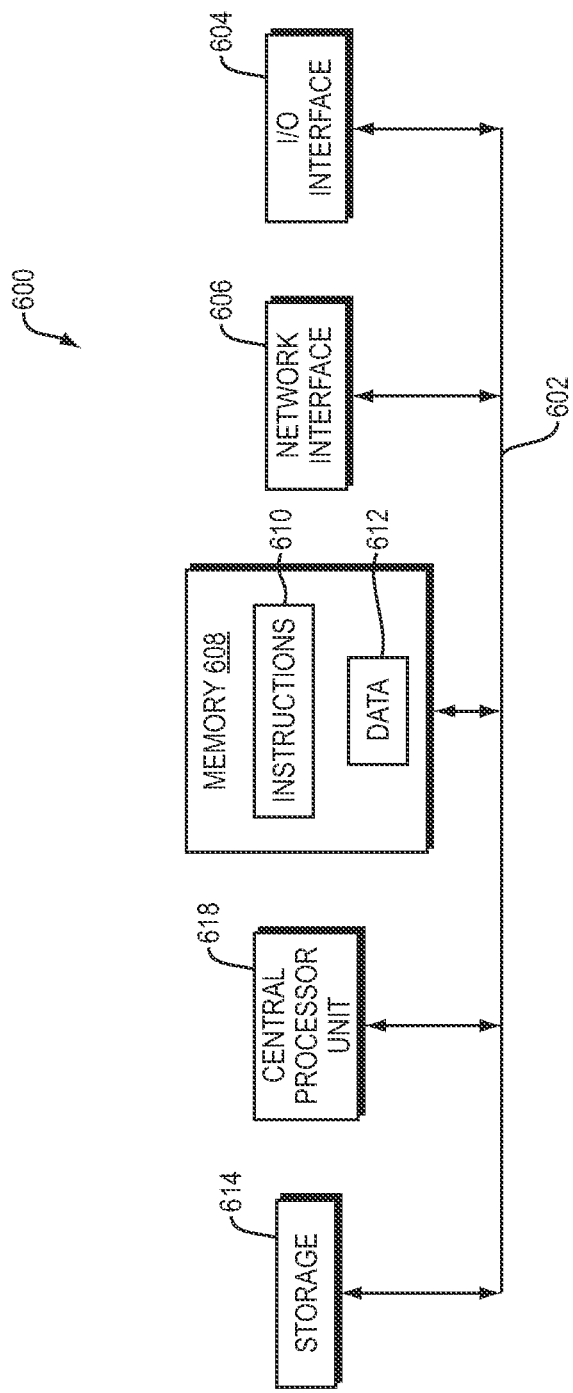
FIG. 6 is a block diagram of an example of an embodiment of an internal structure of a computer in which various embodiments disclosed herein may be implemented.

FIG. 6 is a block diagram of an example of an embodiment of an internal structure of a computer 600 in which various embodiments disclosed herein may be implemented. The computer 600 contains system bus 602, where a bus is a set of hardware lines used for data transfer among the components of a computer or processing system. Bus 602 is essentially a shared conduit that connects different elements of a computer system (e.g., processor, disk storage, memory, input/output ports, network ports, etc.) that enables the transfer of information between the elements. Coupled to system bus 602 is I/O device interface 504 for connecting various input and output devices (e.g., keyboard, mouse, displays, printers, speakers, etc.) to the computer 600. Network interface 606 allows the computer 600 to connect to various other devices attached to a network. Memory 508 provides volatile storage for computer software instructions 610 and data 612 may be used to implement embodiments disclosed herein. Disk storage 614 provides non-volatile storage for computer software instructions 610 and data 612 that may be used to implement embodiments disclosed herein. Central processor unit 618 is also coupled to system bus 602 and provides for the execution of computer instructions.

The teachings of all patents, published applications and references cited herein are incorporated by reference in their entirety.

Further example embodiments of the present invention may be configured using a computer program product; for example, controls may be programmed in software for implementing example embodiments of the present invention. Further example embodiments of the present invention may include a non-transitory computer readable medium containing instructions that may be loaded and executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for enabling recipient interaction with a content stream, the method comprising:

identifying representations, of real-world objects or services in content, to be sent to a recipient via the content stream;

associating identifiers with at least a subset of the representations, the identifiers including enabled and disabled identifiers having respective enabled and disabled states to indicate whether interactions with the subset of the representations are enabled or disabled;

sending the content with the identifiers to the recipient in a manner enabling the recipient to interact with the subset of the representations via the identifiers, interactions by the recipient, during times the subset of the representations associated with the enabled identifiers are presented to the recipient, causing information, selected based on the identifiers, to be provided to the recipient or a third party recipient;

observing the interactions; and determining metrics associated with the interactions observed, the determining including determining metrics associated with the interactions with the enabled identifiers and determining metrics associated with attempts at interactions with the disabled identifiers by the recipient of the content stream.

2. The method of claim 1 wherein the content stream is at least one of the following: an audio data stream or a visual data stream.

3. The method of claim 1 wherein the information is provided contemporaneously or at a subsequent time relative to the recipient interaction with the subset of the representations.

4. The method of claim 1 further comprising providing the information based on at least one of the following: a type of the information, subscription status of a client associated with the information, and profile of the recipient.

5. The method of claim 1 further comprising activating/deactivating presenting the content in a manner enabling the recipient of the content to interact with the subset of the representations via the identifiers based on a preference of the recipient, control by a provider of the content, or optional selection by an entity associated with a corresponding subset of the objects.

6. The method of claim 1 further comprising overlaying an indicator of the enabled identifiers over the content.

7. The method of claim 1 further comprising presenting the information via a device separate from a device used to present the content to the recipient.

8. The method of claim 1 wherein the information is at least one of the following: an advertisement, voting tool, polling information, auction information, questions and answers, announcements, or information associated with content producers, distributors, or sponsors.

9. An apparatus for enabling recipient interaction with a content stream, the apparatus comprising:

a memory; and a processor coupled to the memory, the processor configured to:

identify representations, of real-world objects or services in content, to be sent to a recipient via the content stream;

associate identifiers stored in the memory with at least a subset of the representations, the identifiers including enabled and disabled identifiers having respective enabled and disabled states to indicate whether interactions with the subset of the representations are enabled or disabled;

send the content with the identifiers to the recipient in a manner enabling the recipient to interact with the subset of the representations via the identifiers, interactions by the recipient, during times the subset of the representations associated with the enabled identifiers are presented to the recipient, causing information, selected based on the identifiers, to be provided to the recipient or a third party recipient;

observe the interactions; and determine metrics associated with the interactions observed, including determining metrics associated with the interactions with the enabled identifiers and determining metrics associated with attempts at interactions with the disabled identifiers by the recipient of the content stream.

10. The apparatus of claim 9 wherein the apparatus is a computer server.

11. The apparatus of claim 9 wherein the content stream is at least one of the following: an audio data stream or a visual data stream.

12. The apparatus of claim 9 wherein the information is provided contemporaneously or at a subsequent time relative to the recipient interaction with the subset of the representations.

13. The apparatus of claim 9 wherein the processor is further configured to provide the information based on at least one of the following: a type of the information, subscription status of a client associated with the information, and profile of the recipient.

14. The apparatus of claim 9 wherein the processor is further configured to activate/deactivate presenting the content in a manner enabling the recipient of the content to interact with the subset of the representations via the identifiers based on a preference of the recipient, control by a provider of the content, or optional selection by an entity associated with a corresponding subset of the objects.

15. The apparatus of claim 9 wherein the processor is further configured to overlay an indicator of the identifiers over the content.

16. The apparatus of claim 9 wherein the processor is further configured to present the information via a device separate from a device used to present the content to the recipient.

17. The apparatus of claim 9 wherein the information is at least one of the following: an advertisement, voting tool, polling information, auction information, questions and answers, announcements, or information associated with content producers, distributors, or sponsors.

18. A non-transitory computer-readable medium having stored thereon a sequence of instructions which, when loaded and executed by a processor, causes the processor to:

identify representations, of real-world objects or services in content, to be sent to a recipient via the content stream;

associate identifiers with at least a subset of the representations, the identifiers including enabled and disabled identifiers having respective enabled and disabled states to indicate whether interactions with the subset of the representations are enabled or disabled;

send the content with the identifiers to the recipient in a manner enabling the recipient to interact with the subset of the representations via the identifiers, interactions by the recipient, during times the subset of the representations associated with the enabled identifiers are presented to the recipient, causing information, selected based on the identifiers, to be provided to the recipient or a third party recipient;

observe the interactions; and determine metrics associated with the interactions observed, including determining metrics associated with the interactions with the enabled identifiers and determining metrics associated with attempts at interactions with the disabled identifiers by the recipient of the content stream.

19. A method comprising:
identifying representations, of real-world objects or services in content, to be sent to a recipient via a content stream;
associating identifiers with at least a subset of the representations, the identifiers including enabled and disabled identifiers having respective enabled and disabled states to indicate whether interactions with the subset of the representations are enabled or disabled, to be sent with the content to the recipient via the content stream, to enable recipient interaction with the content stream during times the subset of the representations associated with the enabled identifiers are presented to the recipient;
observing the interactions; and
determining metrics associated with the interactions observed, the determining including determining metrics associated with the interactions with the enabled identifiers and determining metrics associated with attempts at interactions with the disabled identifiers by the recipient of the content stream.

20. The method of claim 19 further comprising sending the content with the identifiers via the content stream to a device in a manner enabling the recipient to interact with the representations via the identifiers through use of a recipient-to-device interface.

21. An apparatus comprising:
a memory;
a processor coupled to the memory, the processor configured to:
identify representations, of real-world objects or services in content to be sent to a recipient via a content stream;
associate identifiers stored in the memory with at least a subset of the representations, the identifiers including enabled and disabled identifiers having respective enabled and disabled states to indicate whether interactions with the subset of the representations are enabled or disabled, to be sent with the content to the recipient via the content stream, to enable recipient interaction the content stream during times the subset of the representations associated with the enabled identifiers are presented to the recipient;
observe the interactions; and
determine metrics associated with the interactions observed, including determining metrics associated with the interactions with the enabled identifiers and determining metrics associated with attempts at interactions with the disabled identifiers by the recipient of the content stream.

22. The apparatus of claim 21 wherein the processor is further configured to send the content with the identifiers via the content stream to a device in a manner enabling the recipient to interact with the representations via the identifiers through use of a recipient-to-device interface.

23. The apparatus of claim 21 wherein the apparatus is a computer server.

24. A non-transitory computer-readable medium having stored thereon a sequence of instructions which, when loaded and executed by a processor, causes the processor to:
identify representations, of real-world objects or services in content, to be sent to a recipient via a content stream; and
associate identifiers with at least a subset of the representations, the identifiers including enabled and disabled identifiers having respective enabled and disabled states to indicate whether interactions with the subset of the representations are enabled or disabled, to be sent with the content to the recipient via the content stream, to enable recipient interaction with the content stream during times the subset of the representations associated with the enabled identifiers are presented to the recipient;
observe the interactions; and
determine metrics associated with the interactions observed, including determining metrics associated with the interactions with the enabled identifiers and determining metrics associated with attempts at interactions with the disabled identifiers by the recipient of the content stream.

25. A method for enabling recipient interaction with a content stream, the method comprising:
presenting content to a recipient in a manner enabling the recipient of the content stream to interact with representations, of real-world objects or services, in the content stream via identifiers associated with the representations, the identifiers including enabled and disabled identifiers having respective enabled and disabled states to indicate whether interactions with the representations are enabled or disabled, interactions by the recipient, during times the representations associated with the enabled identifiers are presented to the recipient, causing information, selected based on the identifiers, to be provided to the recipient or a third party recipient;
observing the interactions; and
determining metrics associated with the interactions observed, the determining including determining metrics associated with the interactions with the enabled identifiers and determining metrics associated with attempts at interactions with the disabled identifiers by the recipient of the content stream.

26. An apparatus for enabling recipient interaction with a content stream, the apparatus comprising:
a memory; and
a processor coupled to the memory, the processor configured to:
present content to a recipient in a manner enabling the recipient of the content stream to interact with representations, of real-world objects or services, in the content stream via identifiers stored in the memory and associated with the representations, the identifiers including enabled and disabled identifiers having respective enabled and disabled states to indicate whether interactions with the representations are enabled or disabled, interactions by the recipient, during times the representations associated with the enabled identifiers are presented to the recipient, causing information, selected based on the identifiers, to be provided to the recipient or a third party recipient;
observe the interactions; and
determine metrics associated with the interactions observed including determining metrics associated with the interactions with the enabled identifiers and determining metrics associated with attempts at interactions with the disabled identifiers by the recipient of the content stream.

27. A non-transitory computer-readable medium having stored thereon a sequence of instructions which, when loaded and executed by a processor, causes the processor to:
present content to a recipient in a manner enabling the recipient of the content stream to interact with representations, of real-world objects or services in the content stream via identifiers associated with the representations, the identifiers including enabled and disabled identifiers having respective enabled and disabled states to indicate whether interactions with the representations are enabled or disabled, interactions by the recipient, during times the representations associated with the enabled identifiers are presented to the recipient, causing information, selected based on the identifiers, to be provided to the recipient or a third party recipient;
observe the interactions; and
determine metrics associated with the interactions observed, including determining metrics associated with the interactions with the enabled identifiers and determining metrics associated with attempts at interactions with the disabled identifiers by the recipient of the content stream.

28. A method for providing information targeted to a specific recipient, the method comprising:
observing interactions with identifiers associated with representations, of real-world objects or services, in a content stream, the identifiers including enabled and disabled identifiers having respective enabled and disabled states to indicate whether interactions with the representations are enabled or disabled, interactions by a recipient of the content stream, during times the representations associated with the enabled identifiers are presented to the recipient, causing information, selected based on the identifiers, to be provided to the recipient or a third party recipient; and
determining metrics associated with the interactions observed, the determining including determining metrics associated with the interactions with the enabled identifiers and determining metrics associated with attempts at interactions with the disabled identifiers by the recipient of the content stream.

29. The method of claim 28 further comprising sending the representations, of the real-world objects or services to the recipient via the content stream.

30. The method of claim 28 further comprising offering to enable interaction with the representations, of the real-world objects or services, associated with the disabled identifiers, to entities involved with commercial use of the real-world objects or services by demonstrating value based on the metrics.

31. The method of claim 28 further comprising collecting the metrics at least at a content server, intermediate network node, source node, or destination node of content stream.

32. The method of claim 28 wherein the metrics are at least one of the following: an overall count of the representations of the real-world objects or services, count of instances of viewing the representations of the real-world objects or services, or attempted interactions with the disabled identifiers.

33. The method of claim 28 wherein the identifiers provide indications of a presence of representations, of the real-world objects or services, within the content stream.

34. An apparatus for providing information targeted to a specific recipient, the apparatus comprising:
a memory; and
a processor coupled to the memory, the processor configured to:
observe interactions with identifiers associated with representations, of real-world objects or services, in a content stream, the identifiers including enabled and disabled identifiers having respective enabled and disabled states to indicate whether interactions with the representations are enabled or disabled, interactions by a recipient of the content stream, during times the representations associated with the enabled identifiers are presented to the recipient, causing information, selected based on the identifiers, to be provided to the recipient or a third party recipient; and
determine metrics associated with the interactions observed, including determining metrics associated with the interactions with the enabled identifiers and determining metrics associated with attempts at interactions with the disabled identifiers by the recipient of the content stream.

35. The apparatus of claim 34 wherein the identifiers are sent to a recipient via the content stream.

36. The apparatus of claim 34 wherein the processor is further configured to offer to enable interaction with the representations associated with the disabled identifiers, of the real-world objects or services, to entities involved with commercial use of the real-world objects or services by demonstrating value based on the metrics.

37. The apparatus of claim 34 wherein the processor is further configured to report the metrics to a content server, intermediate network node, source node, or destination node of the content stream.

38. The apparatus of claim 34 wherein the metrics are at least one of the following: an overall count of the representations of the real-world objects or services, count of instances of viewing the representations of the real-world objects or services, or attempted interactions with the disabled identifiers.

39. The apparatus of claim 34 wherein the identifiers provide indications of a presence of representations, of the real-world objects or services, within the content stream.

40. A non-transitory computer-readable medium having stored thereon a sequence of instructions which, when loaded and executed by a processor, causes the processor to:
observe interactions with identifiers associated with representations, of real-world objects or services, in a content stream, the identifiers including enabled and disabled identifiers having respective enabled and disabled states to indicate whether interactions with the representations are enabled or disabled, interactions by a recipient of the content stream, during times the representations associated with the enabled identifiers are presented to the recipient, causing information, selected based on the identifiers, to be provided to the recipient or a third party recipient; and
determine metrics associated with the interactions observed, including determining metrics associated with the interactions with the enabled identifiers and determining metrics associated with attempts at interactions with the disabled identifiers.

41. The method of claim 1 wherein providing the information is further based on a profile of the recipient, the profile enabling the user to configure an action specifying a manner for the providing or to suppress the providing, the profile enabling the recipient to view historical data regarding enabled interactions that the recipient missed within a same or related content.

* * * * *